(12) United States Patent
Uehara et al.

(10) Patent No.: US 12,471,859 B2
(45) Date of Patent: Nov. 18, 2025

(54) X-RAY DIAGNOSTIC APPARATUS THAT CHANGES A DISPLAY MODE OF A TARGET BASED ON A DETECTION RESULT AND COMPUTER PROGRAM PRODUCT

(71) Applicant: CANON MEDICAL SYSTEMS CORPORATION, Otawara (JP)

(72) Inventors: Hisayuki Uehara, Otawara (JP); Shingo Abe, Nasushiobara (JP); Masaki Kobayashi, Otawara (JP); Keisuke Nakamura, Utsunomiya (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 548 days.

(21) Appl. No.: 17/932,348

(22) Filed: Sep. 15, 2022

(65) Prior Publication Data

US 2023/0101778 A1 Mar. 30, 2023

(30) Foreign Application Priority Data

Sep. 30, 2021 (JP) .................................. 2021-161580
Sep. 2, 2022 (JP) .................................. 2022-139900

(51) Int. Cl.
*A61B 6/46* (2024.01)
*A61B 6/00* (2024.01)
*A61B 6/50* (2024.01)
*G06T 7/00* (2017.01)
*G06T 11/00* (2006.01)

(52) U.S. Cl.
CPC .................. *A61B 6/46* (2013.01); *A61B 6/44* (2013.01); *A61B 6/466* (2013.01); *A61B 6/48* (2013.01);

(Continued)

(58) Field of Classification Search
CPC ....... A61B 6/46–469; A61B 6/44; A61B 6/48; A61B 6/504; A61B 6/5288; G06V 40/15;

(Continued)

(56) References Cited

U.S. PATENT DOCUMENTS 4,349,739 A * 9/1982 Annis .................... G06T 7/0012
250/369
6,222,906 B1 * 4/2001 Sakaguchi ............... A61B 6/06
378/95

(Continued)

FOREIGN PATENT DOCUMENTS

JP 2008-200323 A 9/2008
JP 2009-39521 A 2/2009

(Continued)

Primary Examiner — Scott A Rogers
(74) Attorney, Agent, or Firm — Oblon, McClelland, Maier & Neustadt, L.L.P.

(57) ABSTRACT

An X-ray diagnostic apparatus according to an embodiment includes an X-ray tube, an X-ray detector, image generating circuitry, and processing circuitry. The X-ray tube emits X-rays. The X-ray detector detects X-rays emitted from the X-ray tube and transmitted through a subject. The processing circuitry receives a designating operation related a display mode for a target that is at least one of a region of the subject and an object inserted in the subject. In response to the designating operation, the processing circuitry changes the display mode of the target in an X-ray projection image that is based on a detection result of the X-ray detector, the display mode being changed based on three-dimensional medical image data related to the subject.

16 Claims, 12 Drawing Sheets

(52) U.S. Cl.
CPC ............ *A61B 6/504* (2013.01); *A61B 6/5223* (2013.01); *A61B 6/5288* (2013.01); *G06T 7/0012* (2013.01); *A61B 6/487* (2013.01); *G06T 11/003* (2013.01); *G06T 2207/10081* (2013.01); *G06T 2207/10121* (2013.01); *G06T 2207/30021* (2013.01); *G06T 2207/30101* (2013.01); *G06T 2211/404* (2013.01)

(58) Field of Classification Search
CPC ........... G06V 2201/02; G06V 2201/03; G06V 2201/12; G06T 7/0012; G06T 2207/10072; G06T 2207/10081; G06T 2207/10116; G06T 2207/10121; G06T 2207/30004; G06T 2207/30021; G06T 2207/30101; G06T 2211/404
See application file for complete search history.

(56) References Cited

U.S. PATENT DOCUMENTS

| | | | | |
|---|---|---|---|---|
| 6,614,871 | B1* | 9/2003 | Kobiki | A61B 6/035 |
| | | | | 378/197 |
| 8,744,043 | B2* | 6/2014 | Ohta | A61B 6/12 |
| | | | | 378/97 |
| 10,433,803 | B2* | 10/2019 | Kokubun | A61B 6/5217 |
| 12,014,501 | B2* | 6/2024 | Takahashi | A61B 6/504 |
| 2009/0022262 | A1 | 1/2009 | Ohishi | |
| 2014/0341350 | A1* | 11/2014 | Muroi | A61B 6/504 |
| | | | | 378/62 |

FOREIGN PATENT DOCUMENTS

| | | |
|---|---|---|
| JP | 2018-68982 A | 5/2018 |
| JP | 2020-65593 A | 4/2020 |

* cited by examiner

X-RAY DIAGNOSTIC APPARATUS THAT CHANGES A DISPLAY MODE OF A TARGET BASED ON A DETECTION RESULT AND COMPUTER PROGRAM PRODUCT

CROSS-REFERENCE TO RELATED APPLICATIONS

This application is based upon and claims the benefit of priority from Japanese Patent Applications No. 2021-161580, filed on Sep. 30, 2021 and No. 2022-139900, filed on Sep. 2, 2022; the entire contents of which are incorporated herein by reference.

FIELD

Embodiments disclosed in the specification and the drawings relate generally to an X-ray diagnostic apparatus and a computer program product.

BACKGROUND

Conventionally, an X-ray diagnostic apparatus that irradiates a subject with X-rays and that obtains X-ray projection images based on X-rays transmitted through the subject has been known. In such an X-ray diagnostic apparatus, an X-ray projection image is generated by performing various types of image processing based on raw data (X-ray attenuation image) and information related to the X-ray diagnostic apparatus such as X-ray conditions, for the purpose of improving the visibility of a region of interest.

However, with the image processing using only the information related to the X-ray diagnostic apparatus, it is sometimes difficult to improve the visibility of the region of interest in the X-ray projection image. For example, when the region of interest, such as an angiogram image or a device, overlaps with another region such as a vertebral body along an imaging path defined by the image capturing geometry of the X-ray diagnostic apparatus, it has been sometimes difficult to improve the visibility of the region of interest merely with the image processing using the information related to the X-ray diagnostic apparatus.

DETAILED DESCRIPTION

Figure 1:
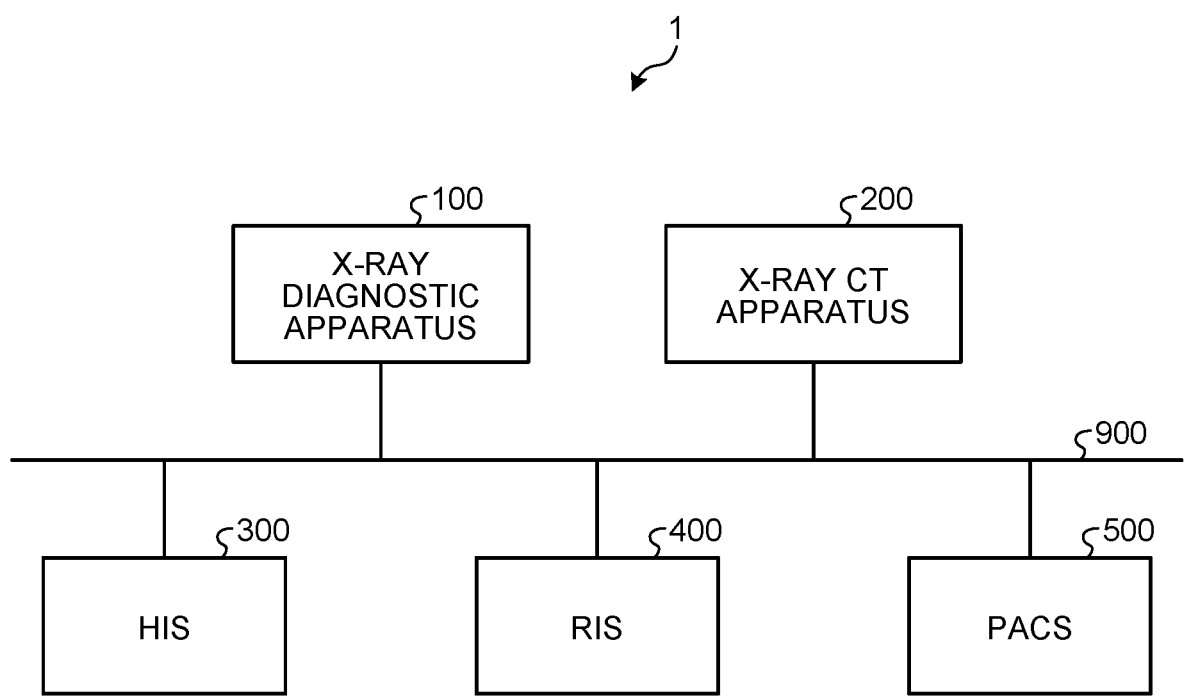
FIG. 1 is a schematic illustrating an exemplary configuration of a medical image processing system according to a first embodiment.

An X-ray diagnostic apparatus according to an embodiment includes an X-ray tube, an X-ray detector, and processing circuitry. The X-ray tube emits X-rays. The X-ray detector detects X-rays emitted from the X-ray tube and transmitted through a subject. The processing circuitry receives a designating operation related to a display mode for a target that is at least one of a region of the subject and an object inserted in the subject. In response to the designating operation, the processing circuitry changes the display mode of the target in an X-ray projection image that is based on a detection result of the X-ray detector, the display mode being changed based on three-dimensional medical image data related to the subject.

An X-ray diagnostic apparatus, a medical image processing apparatus, a medical image processing program, and a storage medium (computer program product) according to the embodiments will now be explained with reference to the drawings. In the following description, elements that have the same or substantially the same functions as those having been already described in relation to the drawings mentioned earlier are given the same reference numerals, and redundant explanations thereof will be provided only when necessary. Even among the depictions of the same part, dimensions and proportions may be different from one another, depending on the drawings. For example, from the viewpoint of ensuring the visibility of the drawings, reference numerals may be appended only to the elements mainly dealt in the description of the drawings, and even if the elements have the same or substantially the same functions, such elements may not be appended with the reference numerals.

Explained in each of the embodiments below is an example in which a medical image processing apparatus according to the corresponding embodiment is installed in an X-ray diagnostic apparatus.

The medical image processing apparatus according to the embodiments is not necessarily installed in an X-ray diagnostic apparatus and may be implemented as an independent apparatus, using a computer having a processor such as a central processing unit (CPU) and a memory such as a read-only memory (ROM) and a random-access memory (RAM) as hardware resources. In such a configuration, the processor in the computer can implement various functions according to the embodiments by executing a computer program read from the ROM or the like, and loaded onto the RAM.

The medical image processing apparatus according to the embodiments may also be implemented in a medical image diagnostic apparatus other than the X-ray diagnostic apparatus. In such a configuration, the processor in such a medical image diagnostic apparatus can implement the functions according to the corresponding embodiment by executing a computer program read from the ROM or the like and loaded onto the RAM. It is possible to implement various functions according to the embodiments. Examples of the medical image diagnostic apparatus other than the X-ray diagnostic apparatus include an X-ray computed tomography (CT) apparatus, a magnetic resonance imaging (MRI) apparatus, an ultrasonic diagnostic apparatus, a single-photon emission computed tomography (SPECT) apparatus, a positron emission computed tomography (PET) apparatus, a SPECT-CT apparatus that is an integration of a SPECT apparatus and an X-ray CT apparatus, and a PET-CT apparatus that is an integration of a PET apparatus and an X-ray CT apparatus.

First Embodiment

FIG. 1 is a schematic illustrating an example of a configuration of a medical image processing system 1 according to a first embodiment. As illustrated in FIG. 1, the medical image processing system 1 includes an X-ray diagnostic apparatus 100, an X-ray CT apparatus 200, a hospital information system (HIS) 300, a radiology information system (RIS) 400, and a medical image management system (picture archiving and communication system (PACS)) 500. Each of these apparatuses included in the medical image processing system 1 is installed in a hospital, for example, and can communicate with other apparatuses over a network 900, such as a local area network (LAN) in the hospital.

The X-ray diagnostic apparatus 100 and the X-ray CT apparatus 200 are medical image diagnostic apparatuses that generate medical image data based on data collected from a subject P.

The medical image diagnostic apparatus performs examinations, based on examination appointment information received from the RIS 400, for example. The medical image diagnostic apparatus generates and transmits examination status information indicating the status of examination to the RIS 400. At this time, the RIS 400 receives the examination status information from the medical image diagnostic apparatus, and outputs the received examination status information to the HIS 300, for example, as the latest examination status information. For example, the HIS 300 receives the latest examination status information, and manages the received examination status information. The examination status information includes an examination ID, a patient ID, examination appointment information such as an examination type and a region to be examined, as well as the date and time of the examination.

A medical image diagnostic apparatus generates medical image data based on the data collected from the subject P. The X-ray diagnostic apparatus 100 emits X-rays from an X-ray tube 13 to the subject P and detects emitted X-rays with an X-ray detector 17. The X-ray diagnostic apparatus 100 generates X-ray projection image data (medical image data) about the subject P based on the X-ray attenuation image data output from the X-ray detector 17. The X-ray diagnostic apparatus 100 will be described later. The X-ray CT apparatus 200 emits X-rays from an X-ray tube to the subject P and detects emitted X-rays with an X-ray detector. The X-ray CT apparatus 200 generates CT image data (medical image data) about the subject P based on the output from the X-ray detector.

The medical image diagnostic apparatus converts the generated medical image data into a format as stipulated in the Digital Imaging and Communication in Medicine (DICOM) standard, for example. In other words, the medical image diagnostic apparatus generates medical image data to which DICOM tags are appended as supplementary information. The supplementary information includes, for example, a patient ID, an examination ID, an apparatus ID, and an image series ID, and is standardized in accordance with the DICOM standard. The apparatus ID is information for identifying the medical image diagnostic apparatus. The image series ID is information used for identifying a single run of imaging carried out by the medical image diagnostic apparatus, and includes, for example, the region of the subject (patient) for which the image is captured, the time at which the image was generated, a slice thickness, and a slice position. For example, by performing a CT examination or an MRI examination, tomographic images at multiple slice positions are acquired as medical image data. The medical image diagnostic apparatus then transmits the generated medical image data to the PACS 500.

The medical image processing system 1 may include, but not limited to the X-ray diagnostic apparatus 100 and the X-ray CT apparatus 200, various types of medical image diagnostic apparatuses such as an MRI apparatus, an ultrasonic diagnostic apparatus, a SPECT apparatus, a PET apparatus, a SPECT-CT apparatus, and a PET-CT apparatus.

The HIS 300 is a system for managing information created in the hospital. The information created in the hospital includes patient information and examination order information. Each record in the patient information includes, as items, a patient ID, a patient name (full name), age (date of birth), sex, height, weight, and blood type. Each record in the examination order information includes, as items, an examination ID for identifying an examination, a patient ID, information indicating inpatient or outpatient status, an examination code, a department, an examination type, a region to be examined, and a scheduled examination date and time.

The examination ID is issued when examination order information is entered, and is an identifier that uniquely identifies the examination order information used in one hospital, for example. The patient ID is assigned to each patient and is an identifier that uniquely identifies the patient in one hospital, for example. The examination code is an identifier that uniquely identifies an examination, as defined in one hospital, for example. The department, for example, indicates the category of the medical treatment in medicine. Specifically, examples of the department include internal medicine and surgery. The examination type indicates an examination using a medical image. Examples of the examination type include an X-ray examination, a CT examination, and an MRI examination. The region to be examined includes the brain, kidneys, lungs, and liver.

When examination order information is entered by a physician requesting an examination, for example, the HIS 300 sends the entered examination order information and the patient information identified in the examination order information to the RIS 400. At this time, the HIS 300 sends the patient information also to the PACS 500. The HIS 300 may be connected to an external network, as well as to the hospital LAN.

The RIS 400 is a system that manages examination appointment information for radiological examination services. For example, the RIS 400 receives examination order information transmitted by the HIS 300, adds various types of setting information to the received examination order information, accumulates the information, and manages the accumulated information as examination appointment information. Specifically, when the RIS 400 receives patient information and examination order information from the HIS 300, the RIS 400 generates examination appointment information required for causing the medical image diagnostic apparatus to operate, from the received patient information and examination order information. The examination appointment information includes information required in performing an examination such as an examination ID, a patient ID, an examination type, and a region to be examined. The RIS 400 transmits the generated examination appointment information to the medical image diagnostic apparatus (X-ray diagnostic apparatus 100 or the X-ray CT apparatus 200).

The PACS 500 is a system that manages various types of medical image data. The PACS 500, for example, receives patient information transmitted from the HIS 300, and manages the received patient information. The PACS 500 includes storage for managing patient information. The PACS 500, for example, receives medical image data transmitted from a medical image diagnostic apparatus, and stores the received medical image data in the local storage, in a manner associated with the patient information. The supplementary information, such as a patient ID, an examination ID, an apparatus ID, and an image series ID, are appended to the medical image data stored in the PACS 500. Therefore, by executing a search using the patient ID or other information, an operator can retrieve necessary patient information from the PACS 500. The operator can also retrieve necessary medical image data from the PACS 500 by executing a search using a patient ID, an examination ID, an apparatus ID, or an image series ID.

The medical image processing system 1 may also include a vendor neutral archive (VNA) system, instead of the HIS 300, the RIS 400, and the PACS 500. The VNA system is an integrated archiving system for centrally managing the PACS 500 from different vendors, and various types of medical data being managed by the systems of different clinical departments (the HIS 300, the RIS 400). The VNA system is connected to, for example, the HIS 300, the RIS 400, and the PACS 500 in a manner enabled to communicate with each other via the hospital network 900 such as a LAN. Various types of information managed and stored in the VNA system are not necessarily acquired from systems manufactured by different vendors, but may also be acquired from systems manufactured by a single vendor.

Figure 2:
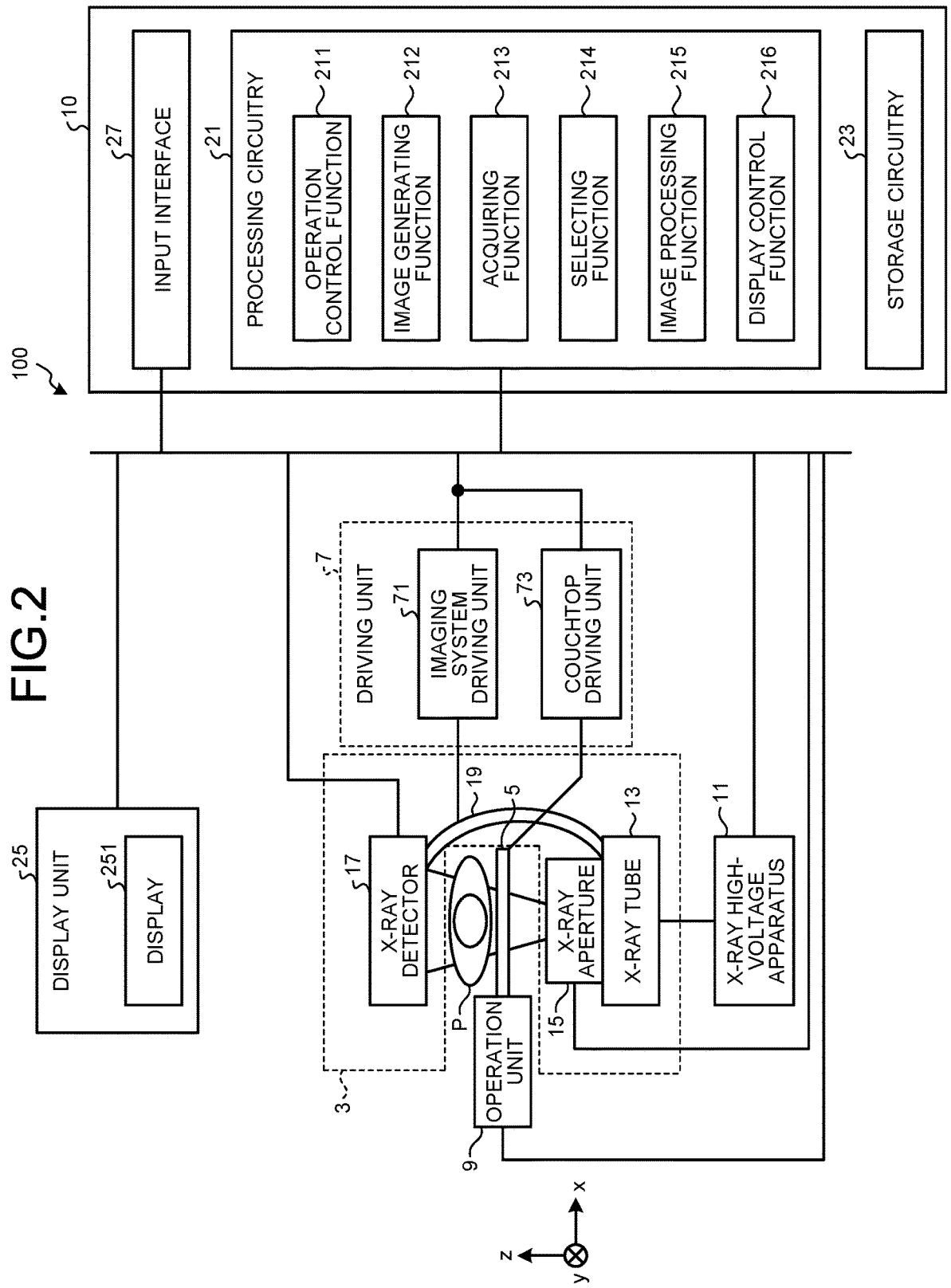
FIG. 2 is a schematic illustrating an exemplary configuration of an X-ray diagnostic apparatus according to the first embodiment.

FIG. 2 is a schematic illustrating an exemplary configuration of the X-ray diagnostic apparatus 100 according to the first embodiment. To make the following description specific, an example of the X-ray diagnostic apparatus 100 being a cardiovascular X-ray diagnostic apparatus will be used as an example.

The X-ray diagnostic apparatus 100 includes an imaging unit 3, a couch 5, a driving unit 7, an operation unit 9, an X-ray high-voltage apparatus 11, processing circuitry 21, storage 23, a display unit 25, and an input interface 27. The processing circuitry 21, the storage 23, and the input interface 27 are incorporated into a console apparatus 10, for example. The imaging unit 3 includes the X-ray tube 13 that irradiates the subject P with X-rays, the X-ray detector 17 that detects X-rays, an X-ray aperture 15, and a gantry 19. The imaging unit 3 also includes a support arm. The operation unit 9 for operating the imaging unit 3 and the couch 5 is provided to the couch 5. The driving unit 7 for driving the imaging unit 3 and the couch 5 includes an imaging system driving unit 71 and a couchtop driving unit 73.

The X-ray high-voltage apparatus 11 includes electric circuitry such as a transformer and a rectifier, a high voltage generator, and an X-ray controller. The high-voltage generator includes a function for generating a high voltage to be applied to the X-ray tube 13 and a filament current to be supplied to the X-ray tube 13. The X-ray controller controls an output voltage based on X-rays to be emitted from the X-ray tube 13. The high voltage generator may be transformer-based or inverter-based. The X-ray high-voltage apparatus 11 may be installed in the gantry 19.

The X-ray tube 13 is a vacuum tube that emits X-rays by emitting thermal electrons from a cathode (filament) toward an anode (target) upon receiving an application of the high voltage and the supply of the filament current from the X-ray high-voltage apparatus 11. When the thermal electrons strike a target, X-rays are generated. The X-ray tube 13 includes, for example, a rotating anode X-ray tube that generates X-rays by emitting thermal electrons to the rotating anode. The X-ray tube 13 is not limited to the type using a rotating anode, but any type of X-ray tube may be used.

The X-ray aperture 15 is provided in front of an X-ray emission window in the X-ray tube 13. The X-ray aperture 15 has four aperture blades made of a metal such as lead. A driving apparatus, not illustrated, drives the aperture blades correspondingly to the region of interest input by the operator via the operation unit 9 or the input interface 27. By causing the driving apparatus to slide the aperture blades, the X-ray aperture 15 adjusts the size of the area where X-rays are to be shielded to a desired size. With the aperture blades adjusted, the X-ray aperture 15 shields X-rays that are present outside the aperture area. In this manner, the X-ray aperture 15 focuses X-rays generated by the X-ray tube 13 in such a manner that the region of interest in the subject P is irradiated with X-rays.

The X-ray detector 17 detects X-rays generated by the X-ray tube 13. The X-ray detector 17 is, for example, a flat panel detector (hereinafter referred to as an FPD). The FPD has a plurality of semiconductor detectors. Types of semiconductor detectors include a direct conversion detector that converts X-rays directly into electrical signals, and an indirect conversion detector that converts X-rays into light using a phosphor, and then the resultant light into an electrical signal. Any of these types may be used as the FPD. The electrical signals generated by the semiconductor detectors, as X-ray becomes incident thereto, are output to an analog-to-digital converter (hereinafter referred to as an A/D converter), not illustrated. The A/D converter converts an electrical signal into digital data. The A/D converter outputs the digital data to the processing circuitry 21. It is possible to use an image intensifier as the X-ray detector 17.

The gantry 19 is a C-shaped arm supporting the X-ray tube 13 and the X-ray detector 17. The gantry 19 is rotated and moved around the subject P lying on the couch 5, by a motor not illustrated. The gantry 19 is supported rotatably about each of X, Y, and Z axes that are three axes orthogonal to one another, and is rotated about each of these axes by a driving unit not illustrated.

The processing circuitry 21 controls the overall operations of the X-ray diagnostic apparatus 100 based on the electric signals corresponding to an input operation output from the operation unit 9 or the input interface 27. For example, the processing circuitry 21 includes, as its hardware resources, a processor such as a central processing unit (CPU), a micro-processing unit (MPU), or a graphics processing unit (GPU), and memories such as a read-only memory (ROM) and a random-access memory (RAM).

Processing functions executed by the processing circuitry 21 are stored as computer-executable programs in the storage 23. The processing circuitry 21 is a processor implementing a function corresponding to a computer program, by reading the computer program from the storage 23, and executing the computer program. In other words, the circuitry having read the computer program comes to have the function corresponding to the read computer program.

Specifically, the processing circuitry 21 executes an operation control function 211, an image generating function 212, an acquiring function 213, a selecting function 214, an image processing function 215, and a display control function 216, by the processor executing a computer program having been loaded onto the memory. The processing circuitry 21 implementing the selecting function 214 is an example of a receiving unit. The processing circuitry 21 implementing the image processing function 215 is an example of an image processing unit.

Configurations of the operation control function 211, the image generating function 212, the acquiring function 213, the selecting function 214, the image processing function 215, and the display control function 216 are not limited to the implementation using one piece of processing circuitry. It is also possible to implement the operation control function 211, the image generating function 212, the acquiring function 213, the selecting function 214, the image processing function 215, and the display control function 216, by using a combination of a plurality of independent processors as the processing circuitry, and by causing each of the processors to execute a corresponding computer program.

It is also possible for the processing circuitry 21 to be implemented with an application specific integrated circuit (ASIC), a field-programmable gate array (FPGA), a complex programmable logic device (CPLD), or a simple programmable logic device (SPLD).

The operation control function 211 controls the driving unit 7, the X-ray high-voltage apparatus 11, the X-ray aperture 15, the storage 23, the display unit 25, the image generating function 212, the acquiring function 213, the selecting function 214, the image processing function 215, the display control function 216, and the like, based on an input operation received from an operator via the operation unit 9 or the input interface 27. Specifically, the operation control function 211 reads a control program stored in the storage 23, loads the control program onto the memory in the processing circuitry 21, and controls the units included in the X-ray diagnostic apparatus 100 in accordance with the loaded control program.

The image generating function 212 generates image data based on an output from the X-ray detector 17. Specifically, the image generating function 212 generates projection data (X-ray attenuation image data) based on the outputs from the X-ray detector 17. The image generating function 212 then receives an input signal from the operation unit 9 or the input interface 27, and generates an X-ray projection image by applying processing such as defect pixel correction, gain correction, and offset correction, to the output signals from the X-ray detector 17. The X-ray projection image corresponds to a medical image including a fluoroscopic image and a radiographic image related to the subject P. The image generating function 212 performs processing such as synthesizing processing and subtracting processing (subtraction), using X-ray projection images. The image generating function 212 generates an X-ray projection image with improved visibility of the region of interest, based on an X-ray attenuation image for which the amount of X-ray attenuation related to a selected region has been compensated by the image processing function 215, which will be described later. The image generating function 212 outputs the generated X-ray projection image to the storage 23.

In the description herein, a fluoroscopic image refers to an image acquired by fluoroscopy. The radiographic image refers to an image acquired by radiography. "Fluoroscopy" is an imaging technique for acquiring X-ray projection images (typically moving images) related to the internals of the subject P in real time by continuously emitting X-rays from the X-ray tube 13. "Radiography" is an imaging technique for obtaining more detailed still or moving X-ray projection images of the internals of the subject P by emitting X-rays at a higher intensity than that used in the fluoroscopy.

The acquiring function 213 acquires a raw live X-ray attenuation image (projection data) related to the subject P, and CT volume data (three-dimensional medical image data) that the X-ray CT apparatus 200 has acquired from the same subject P. At this time, the X-ray attenuation image related to the subject P is representation of subject signals corresponding to the amounts of attenuation of X-rays in respective X-ray paths having transmitted through the subject P.

Figure 3:
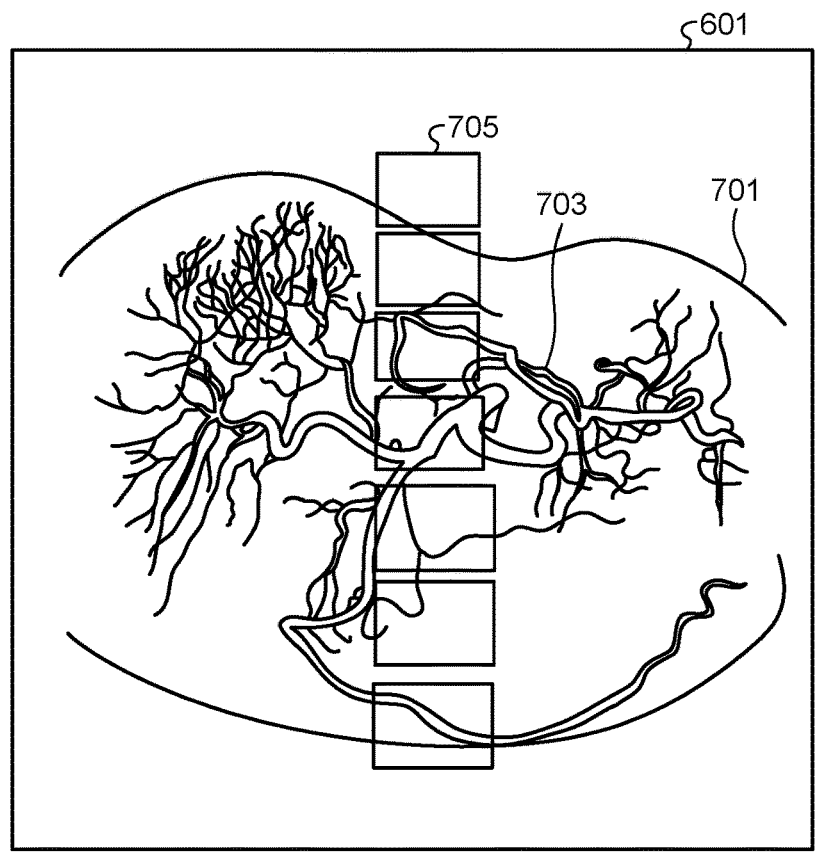
FIG. 3 is a schematic illustrating an example of an X-ray projection image before compensation according to the first embodiment.

The selecting function 214 receives a designating operation related to a mode in which a region of the subject P is to be displayed. The selecting function 214 also receives a selecting operation for selecting a region of the subject P for which the display mode is to be changed. Specifically, the selecting function 214 receives a selection of a region of body tissues, e.g., those of a bone or an organ, having been selected by the operator via the operation unit 9 or the input interface 27. FIG. 3 is a schematic illustrating an example of an X-ray projection image 601 before compensation according to the first embodiment. For example, in response to the X-ray projection image 601 being displayed in real time on a display 251, the operator selects a region for which the display mode is to be changed, in order to improve the visibility of the region of interest. As an example, the operator selects vertebrae 705 overlapping with blood vessels 703 in the X-ray projection image 601, as a region where the display mode is to be changed, in order to improve the visibility of the blood vessels 703 making up the region of interest.

The selecting function 214 also receives a designation of the display mode related to the selected region from the operator, via the operation unit 9 or the input interface 27. For example, the operator designates the darkness at which the selected region is to be displayed. Specifically, the operator chooses to display the selected region lighter or the selected region darker, selectively. Selectively displaying a selected region lighter is not limited to displaying the darkness of the selected region lighter by giving transparency thereto, but also includes displaying only the contour of a bone or an organ, and not displaying the selected region. A situation in which the selected region is to be darkened is when the region of interest for which the visibility is to be improved is selected as the selected region.

The image processing function 215 changes the display mode for the selected region in the X-ray projection image that is based on the detection results (X-ray attenuation image) of the X-ray detector 17, based on the CT volume data related to the subject P, in accordance with the designating operation made by the operator. The image processing function 215 changes the display mode for the selected region in the X-ray projection image that is based on the detection results of the X-ray detector 17, in accordance with the selecting operation made by the operator, based on the CT volume data related to the subject P. The display mode herein includes a designation as to whether the selected region is to be depicted or not to be depicted, and a designation of a degree by which the selected region is to be depicted. In other words, changing the display mode includes changing the darkness in which the selected region is displayed, and changing as to display or not to display the selected region.

Figure 4:
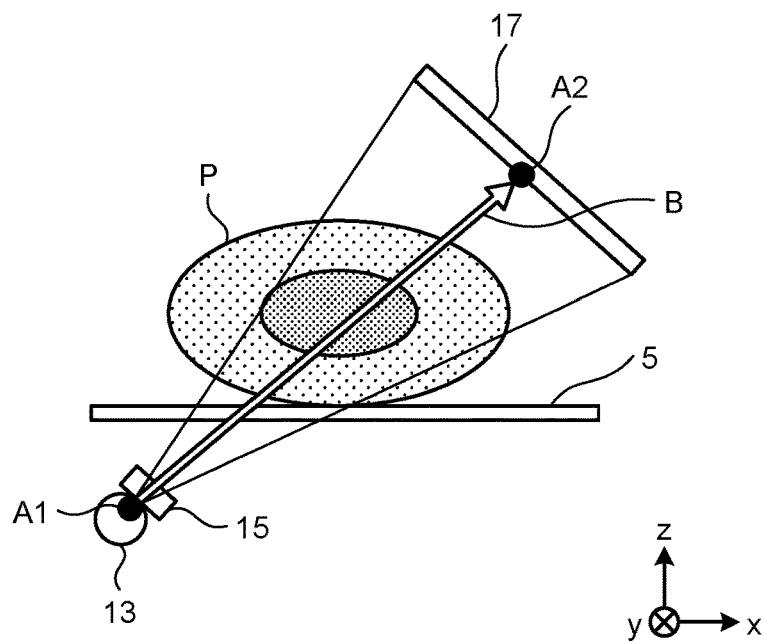
FIG. 4 is a schematic illustrating an image capturing geometry of the X-ray diagnostic apparatus according to the first embodiment.

FIG. 4 is a schematic illustrating an image capturing geometry of the X-ray diagnostic apparatus 100 according to the first embodiment. Specifically, the image processing function 215 maps a piece of CT volume data to the image capturing geometry of the X-ray diagnostic apparatus 100. This mapping can be performed as appropriate using a known technique for achieving an alignment between an X-ray projection image and a CT image. The image processing function 215 determines, for the selected region for which the display mode is to be changed, X-ray paths from a focal point A1 of the X-ray tube 13 to the entire detection plane of the FPD in the X-ray detector 17. FIG. 4 illustrates an X-ray path B from the focal point A1 of the X-ray tube 13 to a point A anywhere on a detection plane of the FPD in the X-ray detector 17, the path passing through the selected region. The image processing function 215 calculates a compensation value (X2) for the amount of X-ray attenuation in the case of including the selected region, for each X-ray path B based on the CT volume data.

The compensation value X2 may be calculated, for example, by the following Equation (1).

$$X2 = [X0 \times (e^{-\mu n'(kV) \cdot dn'} - e^{-\Sigma \mu m(kV) \cdot dn})] \times X1/100 \quad (1)$$

In this equation, X0 denotes an X-ray dose on the detection plane of the FPD in the X-ray detector 17 with no absorber; μn(kV) denotes the attenuation coefficient of the entire substance on the X-ray path (1 to n); do denotes the thickness of the entire substance on the X-ray path (1 to n); μn'(kV) denotes the attenuation coefficient of the substance excluding the selected region, on the X-ray path (1 to n'); dn' denotes the thickness of the substance excluding the selected region on the X-ray path (1 to n'); and X1 denotes an X-ray dose correction ratio (%).

The X-ray dose correction ratio (X1%) is a percentage by which the amount of attenuation in the selected region is compensated, and is a value determined by a designation of the display mode for the selected region, as described above. For example, if the selected region is not to be displayed, the X-ray dose correction ratio is set to 100%. If the darkness of the selected region is to be changed, the X-ray dose correction ratio is set to less than 100%. In the example herein, the X-ray dose correction ratio is a positive value when the selected region is to be displayed lighter, and is set to a negative value when the selected region is to be displayed darker.

By adding the calculated compensation value (X2) to the raw live X-ray attenuation image (projection data), the image processing function 215 performs calculation for an X-ray attenuation image for which the amount of X-ray attenuation related to the selected region is compensated. The image processing function 215 outputs the calculated X-ray attenuation image after the compensation, to the storage 23.

The display control function 216 displays an image on the display 251, based on various types of image data generated by the image generating function 212. For example, the display control function 216 causes the display 251 to display an X-ray projection image based on the X-ray projection image data generated by the image generating function 212.

Figure 5:
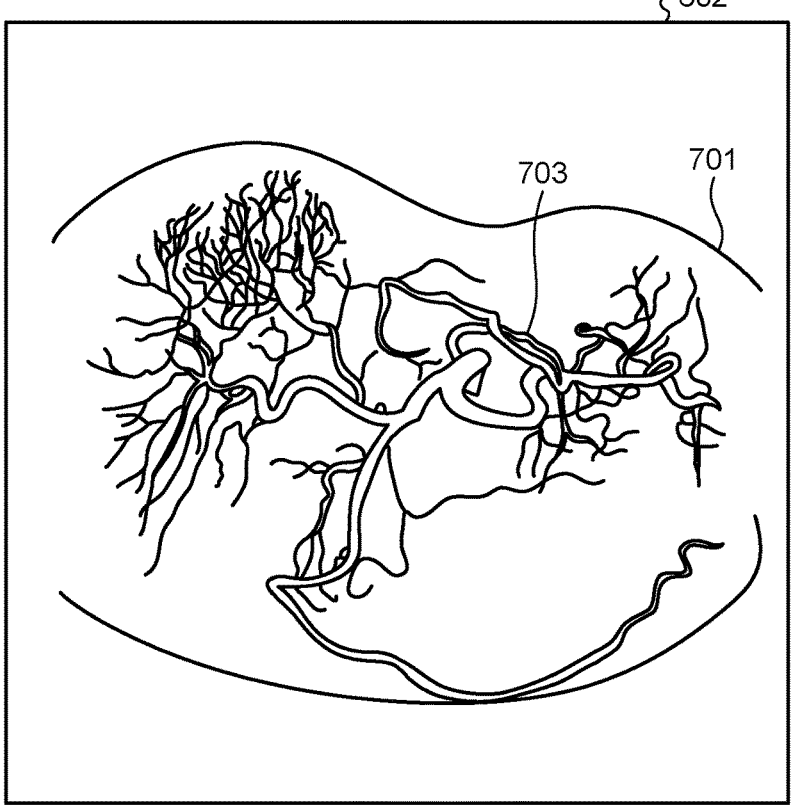
FIG. 5 is a schematic illustrating an example of an X-ray projection image after the compensation according to the first embodiment.

FIG. 5 is a schematic illustrating an exemplary X-ray projection image 602 after compensation according to the first embodiment. FIG. 5 illustrates an example in which the blood vessels 703 (angiogram image) illustrated in FIG. 3 are the region of interest, the vertebrae 705 are selected as a region for which the display mode is to be changed, and the display mode for the selected region is designated as no-display. In such a case, the image generating function 212 generates an X-ray projection image 602 in which the visibility of a liver 701 and the blood vessels 703 is improved by not displaying the vertebrae 705, based on the X-ray attenuation image for which the amount of X-ray attenuation related to the vertebrae 705 has been compensated by the image processing function 215, as illustrated in FIG. 5.

Figure 6:
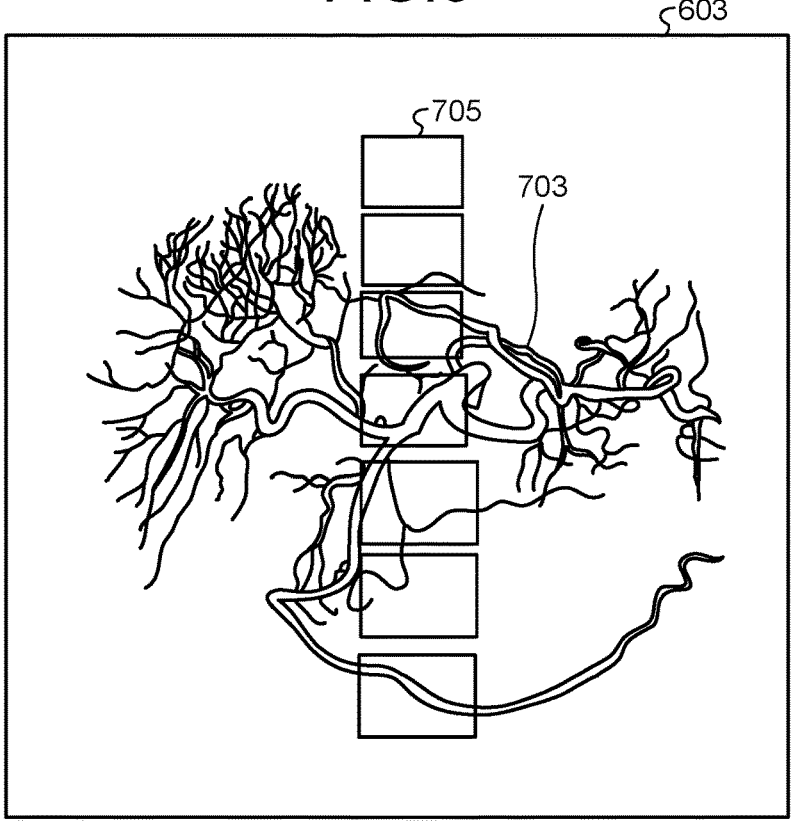
FIG. 6 is a schematic illustrating an example of an X-ray projection image after the compensation according to the first embodiment.

FIG. 6 is a schematic illustrating an exemplary X-ray projection image 603 after compensation according to the first embodiment. FIG. 6 illustrates an example in which the blood vessels 703 (angiogram image) illustrated in FIG. 3 are the region of interest, the liver 701 is selected as a region for which the display mode is to be changed, and the display mode for the selected region is designated as no-display. In this example, the image generating function 212 generates the X-ray projection image 603 in which the visibility of the blood vessels 703 and the vertebrae 705 is improved by not displaying the liver 701, based on the X-ray attenuation image for which the amount of X-ray attenuation related to the liver 701 is compensated by the image processing function 215, as illustrated in FIG. 6.

The storage (memory) 23 may be a storage device, such as a hard disk drive (HDD), a solid state drive (SSD), and an integrated circuit storage device storing therein various types of information, or circuitry that is combination of these storage devices. The storage 23 includes, for example, a temporary storage and a long-term storage. Medical images sequentially and temporary stored in the temporary storage are updated at a regular interval, for example. The temporary storage and the long-term storage are examples of a first memory and a second memory, respectively. The storage 23 also stores therein projection data (X-ray attenuation image), image data, and computer programs corresponding to various functions to be read and executed by the processing circuitry 21. The storage 23 may not only be an HDD or an SSD but also a driver device reading and writing various types of information from and to a portable storage medium, such as a compact disc (CD), a digital versatile disc (DVD), and a flash memory, or from or to a semiconductor memory device such as a random-access memory (RAM). The storage 23 may be located in an external storage device that is connected over a network. When the storage 23 includes a plurality of storage devices, some of the storage devices may be storage devices that are connected over a network.

The storage 23 stores therein image data acquired as a result of fluoroscopy or radiography executed by the X-ray diagnostic apparatus 100. The storage 23 stores therein images such as an X-ray projection image in which the visibility of the region of interest is improved by compensating for the amount of X-ray attenuation related to the selected region. The storage 23 may store therein image data to be displayed.

The display unit 25 includes the display 251 that displays a medical image, for example, internal circuitry that supplies a display signal to the display 251, and peripheral circuitry, such as a connector and a cable for connecting the display 251 to the internal circuitry. The internal circuitry generates display data by superimposing supplementary information, such as subject information and conditions under which the projection data is generated, over the image data. To the resultant display data, the internal circuitry applies D/A conversion and conversion into a TV format. The internal circuitry displays the display data applied with the conversions onto the display 251, as a medical image. The display unit 25 also displays a graphical user interface (GUI) or the like for receiving various operations from the operator.

As the display 251, for example, a liquid crystal display (LCD), a cathode-ray tube (CRT) display, an organic electroluminescence display (GELD), a plasma display, or other types of display may be used as appropriate. The display 251 may be a desktop display, or may be configured as a tablet terminal or another type of device capable of communicating with the processing circuitry 21 wirelessly. One, or two or more projectors may also be used as the display 251.

The input interface 27 converts an input operation received from the operator into an electric signal, and outputs the electric signal to the processing circuitry 21. For example, the input interface 27 receives operations for operating at least one of the imaging unit 3 and the couch 5, X-ray conditions related to generations of X-rays, conditions related to image processing performed by the image generating function 212, and the like, from the operator. As the input interface 27, a mouse, a keyboard, a trackball, a switch, a button, a joystick, a footswitch, a touchpad, and a touch panel display may be used, for example, as appropriate. The input interface 27 is mounted on the console apparatus 10 installed in an operation room that is different from an examination room, for example.

In the present embodiment, the input interface 27 is not limited to those with physical operating components such as a mouse, a keyboard, a trackball, a switch, a button, a joystick, a touchpad, and a touch panel display. Examples of the input interface 27 also include, for example, electric signal processing circuitry for receiving an electric signal corresponding to an input operation from an external input device that is provided separately from the apparatus, and for outputting the electric signal to the processing circuitry 21. The input interface 27 may be configured as a tablet terminal or another type of device capable of communicating with the processing circuitry 21 wirelessly.

Figure 7:
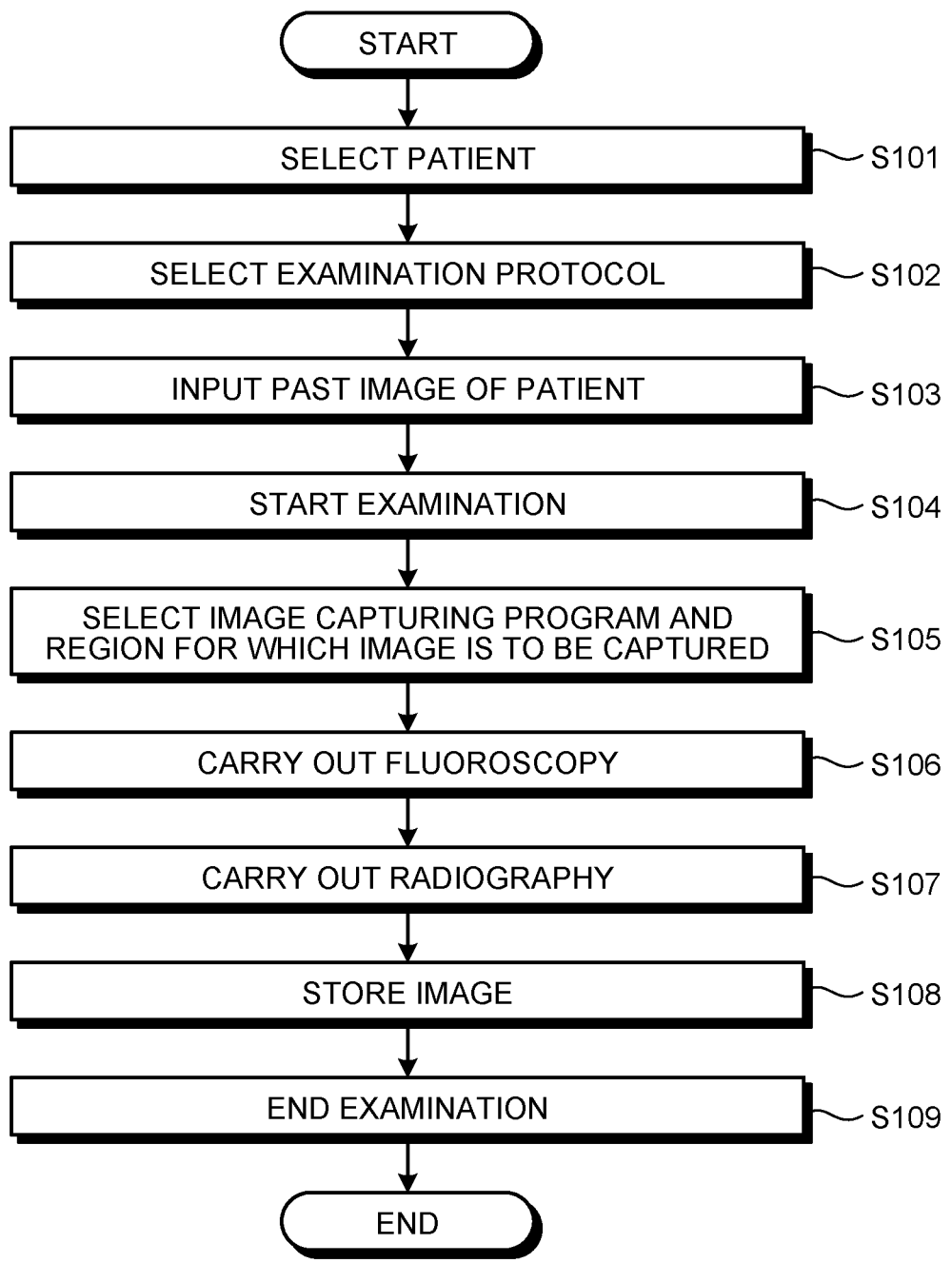
FIG. 7 is a flowchart illustrating an example of a workflow according to the first embodiment.

FIG. 7 is a flowchart illustrating an example of a workflow according to the first embodiment.

To begin with, in response to a selecting operation of an operator, such as a technician or a physician, via the operation unit 9 or the input interface 27, the selecting function 214 selects a patient (subject P) who is to be examined using the X-ray diagnostic apparatus 100 (Step S101). The subject P may be selected, for example, in response to an operation for selecting, for example, an examination ID, a patient ID, an examination type, and a region to be examined, included in the examination appointment information transmitted from the RIS 400 to the X-ray diagnostic apparatus 100, or in response to an operation for inputting a patient name, an examination ID, or a patient ID, for example.

In response to the selecting operation received from the operator via the operation unit 9 or the input interface 27, the selecting function 214 selects an examination protocol corresponding to the examination to be performed for the selected subject P (Step S102). The examination protocol may be included in the examination appointment information, or may be selected by the selecting function 214 or the like based on the examination appointment information. The examination protocol included in the examination appointment information and the examination protocol selected by the selecting function 214 or the like based on the examination appointment information may be changed or corrected based on an input operation received from the operator, via the operation unit 9 or the input interface 27.

In response to the selecting operation received from the operator via the operation unit 9 or the input interface 27, the acquiring function 213 selects a CT image acquired for the selected subject P by the X-ray CT apparatus 200, and inputs the CT image to the X-ray diagnostic apparatus 100 (Step S103). The CT image may be acquired automatically by the acquiring function 213 or the like from the PACS 500, based on the examination ID, the patient ID, or the like.

The X-ray diagnostic apparatus 100 then starts the examination of the subject P (Step S104). In the examination, the selecting function 214 selects an image capturing program and a region an image of which is to be captured, based on the selecting operation by the operator (Step S105). The operation control function 211 performs processing such as positioning by the fluoroscopy (Step S106), and captures an image (Step S107). After the fluoroscopy or the radiography, the selecting function 214 selects the X-ray projection image to be stored, in response to a selecting operation of the operator, and stores the X-ray projection image in the storage 23 (Step S108). The examination of the subject P executed by the X-ray diagnostic apparatus 100 is then ended (Step S109).

The flowchart illustrated in FIG. 7 is an example of the workflow according to the embodiment, and it is possible to change the order of these steps, or to add another step or to delete a step to or from the workflow. For example, in an actual examination, Steps S105 to S108 may be repeated in any order, depending on the situation. As an example, Steps S105 to S108 may be performed while changing the image capturing program or the region, in the order according to the image capturing program and the region. As an example, the fluoroscopy at Step S106 may be repeated. At this time, the fluoroscopy performed at Step S106 is not limited to that performed for positioning, but may also be performed for any other purposes.

Figure 8:
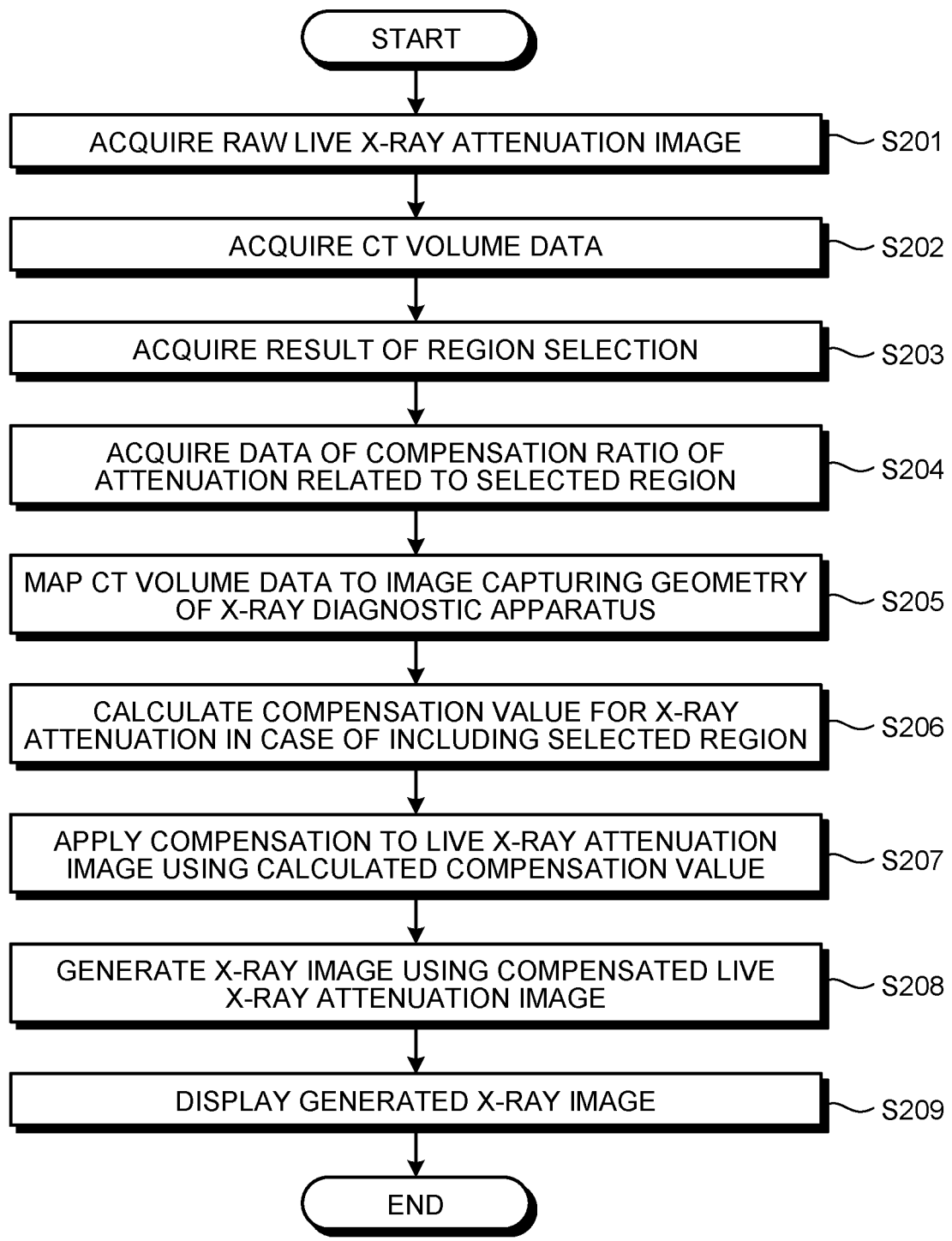
FIG. 8 is a flowchart illustrating an example of image processing according to the first embodiment.

FIG. 8 is a flowchart illustrating an example of image processing according to the first embodiment. The image processing illustrated in FIG. 8 is performed at Step S106 or Step S107 in the workflow illustrated in FIG. 7, for example.

The acquiring function 213 acquires the raw live X-ray attenuation image (projection data) for the selected subject P (Step S201). The image generating function 212 generates an X-ray image to be displayed, based on the projection data. The display control function 216 causes the display 251 to display the generated X-ray projection image to be displayed.

The acquiring function 213 acquires, for the selected subject P, CT image data (volume data) acquired by the X-ray CT apparatus 200 (Step S202).

The selecting function 214 also receives a selection of a region of body tissues, such as that of a bone or an organ, from the operator, via the operation unit 9 or the input interface 27. The acquiring function 213 acquires the result of the selection of the region received by the selecting function 214 (Step S203).

The selecting function 214 also receives a designation of the display mode related to the selected region from the operator, via the operation unit 9 or the input interface 27. The acquiring function 213 acquires the designation of the display mode, that is, data of a compensation ratio (X-ray dose compensation ratio) of attenuation related to the selected region received by the selecting function 214, (Step S204).

The image processing function 215 maps the CT volume data to the image capturing geometry of the X-ray diagnostic apparatus 100 (Step S205). The image processing function 215 also calculates the compensation value (X2) for the amount of X-ray attenuation in the case of including the selected region (Step S206). The image processing function 215 applies a compensation to the live X-ray attenuation image acquired at Step S201 using the calculated compensation value (X2) (Step S207).

The image generating function 212 generates an X-ray projection image using the live X-ray attenuation image for which the amount of X-ray attenuation related to the selected region has been compensated by the image processing function 215 (Step S208). The display control function 216 causes the display 251 to display the generated X-ray projection image (Step S209). The sequence illustrated in FIG. 8 is then ended.

The flowchart illustrated in FIG. 8 is an example of the sequence of the image processing according to the embodiment, and it is possible to change the order of these steps, or to add another step or to delete a step to or from this sequence. For example, in the actual processing, Steps S203 to S209 may be repeated in any order, depending on the situation. As an example, while the selected region and the display mode are changed, Steps S203 to S209 may be performed in any order based on the selected region or the display mode.

As explained above, the X-ray diagnostic apparatus 100 according to the embodiment changes the display mode of the selected region in the X-ray projection image that is based on the detection result (X-ray attenuation image) of the X-ray detector 17, based on the CT volume data related to the subject P, in accordance with the designating operation made by the operator. Thus, by performing the image processing using information about the subject P acquired by the X-ray CT apparatus 200, in addition to the image processing that is based on the information acquired by the X-ray diagnostic apparatus 100, it is possible to change the display mode of a region of body tissues, e.g., an angiogram image, selectively. For example, it is possible to acquire an angiogram image without any bone (digital subtraction angiography (DSA)) from the head to the toes of the subject P in real time, while moving the couchtop of the couch 5. Therefore, with the technology according to the embodiment, it is possible to improve the visibility of a body tissue region in an X-ray projection image.

Second Embodiment

An X-ray diagnostic apparatus 100 according to a second embodiment will now be explained. Differences with respect to the first embodiment will be mainly explained below.

Figure 9:
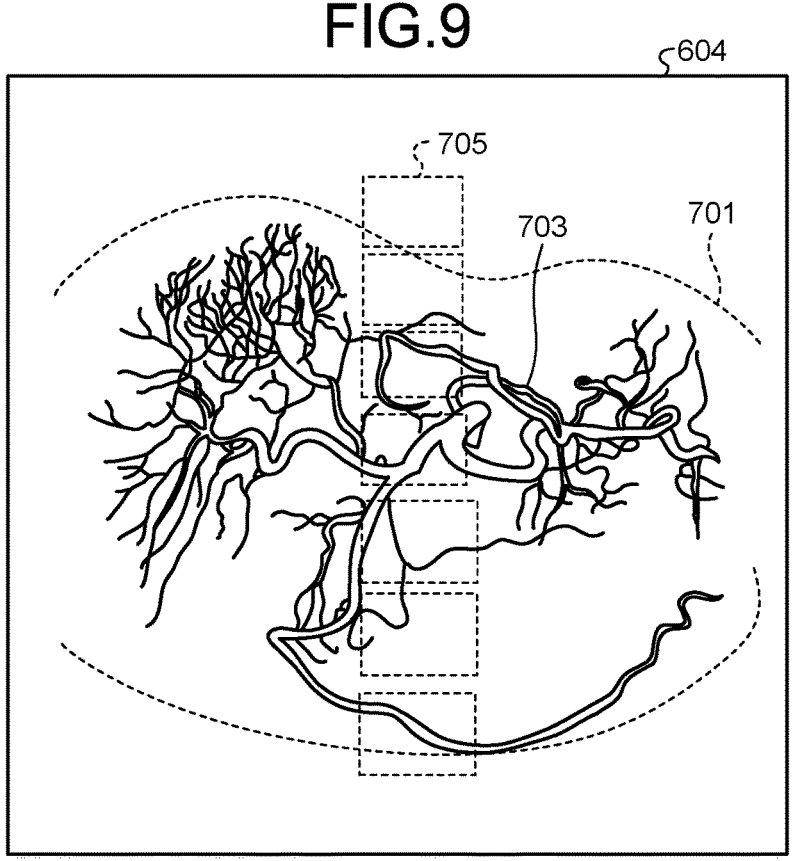
FIG. 9 is a schematic illustrating an example of an X-ray projection image after compensation according to a second embodiment.

Used in the first embodiment is an example in which the display mode is changed selectively for a region of body tissues, but the embodiment is not limited thereto. It is also possible to select the entire tissue as the selected region. FIG. 9 is a schematic illustrating an exemplary X-ray projection image 604 after compensation according to the second embodiment. FIG. 9 illustrates an example in which the blood vessels 703 (angiogram image) illustrated in FIG. 3 are the region of interest, and the entire tissue (the liver 701, the vertebrae 705, and other regions not illustrated) is selected as a region for which the display mode is to be changed, and transparency is designated as the display mode for the selected region. In this case, by adding the calculated compensation value (X2) to the raw live X-ray attenuation image (projection data), the image processing function 215 performs calculation for an X-ray attenuation image for which the amount of X-ray attenuation is compensated, across the entire region as a background image. The image generating function 212 then generates the X-ray projection image 604 applied with a change by which the entire tissue is displayed lighter, as illustrated with the dashed lines in FIG. 9.

In this manner, with the X-ray diagnostic apparatus 100 according to the second embodiment, because the amount of X-ray attenuation can be compensated across the entire tissue as a background image, it is possible to improve the visibility of elements that are not included in the CT image and included only in the X-ray projection image, such as the blood vessels 703, devices, and catheters with contrast agent. In addition, with the technology according to this embodiment, it is possible that the entire tissue is not displayed without using any mask image. In other words, because an angiographic (DSA) image can be acquired without the need for carrying out radiography to obtain a mask image, this contributes to a reduction of the radiation exposure.

Third Embodiment

An X-ray diagnostic apparatus 100 according to a third embodiment will now be explained. Differences with respect to the first embodiment will be mainly explained below.

Explained in the first embodiment is an example in which the region for which the display mode is changed is selected, but the embodiment is not limited thereto. The X-ray diagnostic apparatus 100 may be configured in such a manner that the visibility of the selected region or a part thereof is improved in response to an operator's selection of a region for which the display mode is not to be changed. For example, the selecting function 214 receives a region other than the region selected by the operator as the selected region. Even with this configuration, the same advantageous effects as those achieved in the first embodiment can be achieved. Furthermore, when a part of a bone is to be displayed, it is possible that display of a part of the bone is used as a marker. In other words, with the technology according to the embodiment, it is also possible to change the display mode for bones other than that serving as a landmark. As an example, it is possible that only the vertebra C1 is displayed and the other vertebrae C2 to C7, T1 to T12, and L1 to L5 are not displayed. The technology according to the embodiment may be combined with those according to any of the embodiments described above.

Fourth Embodiment

An X-ray diagnostic apparatus 100 according to a fourth embodiment will now be explained. Differences with respect to the second embodiment will be mainly explained below.

In the X-ray diagnostic apparatus 100 according to this embodiment, the image processing function 215 sets not to display the entire tissue, based on the detection results (X-ray attenuation image) of the X-ray detector 17 during angiography, in the same manner as in the second embodiment. In other words, the image generating function 212 generates an X-ray projection image depicting an image of the blood vessels during the angiography. The image generating function 212 outputs the generated X-ray projection image as a roadmap image to the storage 23.

Figure 10:
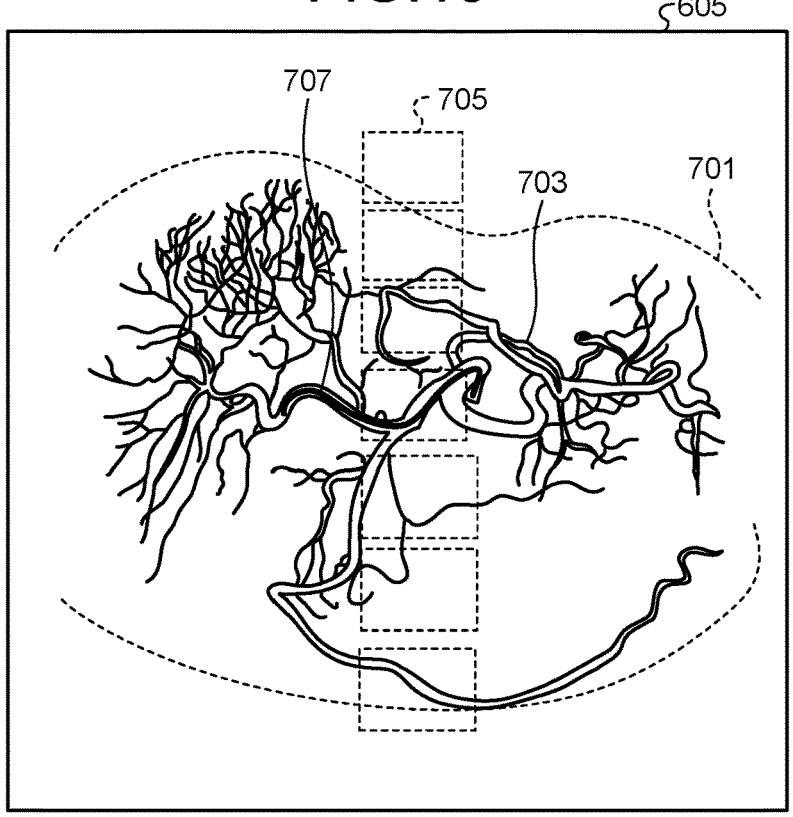
FIG. 10 is a schematic illustrating an exemplary X-ray projection image after compensation according to a fourth embodiment.

The processing circuitry 21 performs the sequence illustrated in FIG. 8 during the fluoroscopy or the radiography, in the same manner as in the second embodiment. FIG. 10 is a schematic illustrating an exemplary X-ray projection image 605 after compensation according to the fourth embodiment. As illustrated in FIG. 10, the display control function 216 superimposes the roadmap image depicting the blood vessels 703 over the X-ray projection image that is based on the X-ray attenuation image for which the amount of X-ray attenuation is compensated at Step S209.

Thus, according to the X-ray diagnostic apparatus 100 of this embodiment, a mask image as a roadmap in a roadmap display can be generated. The technology according to the embodiment may be combined with those according to any of the embodiments described above.

Fifth Embodiment

An X-ray diagnostic apparatus 100 according to a fifth embodiment will now be explained. Differences with respect to the first embodiment will be mainly explained below.

In this X-ray diagnostic apparatus 100, the selecting function 214 selects a selected region, and designates the display mode for the selected region, in accordance with the examination protocol selected at S102 (Steps S202, S203). The correspondence between the examination protocol, the selected region, and a designation of the display mode is determined and stored in the storage 23, in advance, for example.

As an example, if a percutaneous coronary intervention (PCI) protocol is selected as an examination protocol, the selecting function 214 selects the spine, the ribs, and the diaphragm as the regions for which the display mode is to be changed.

As an example, if an examination protocol for thoracic angiography is selected, the selecting function 214 selects the spine, the ribs, the diaphragm, and the lungs themselves as the regions for which the display mode is to be changed.

As an example, if an examination protocol for cerebral angiography is selected, the selecting function 214 selects the skull as the region for which the display mode is to be changed.

As an example, if an examination protocol for abdominal angiography is selected, the selecting function 214 selects the spine as the region for which the display mode is to be changed.

In the X-ray diagnostic apparatus 100 according to this embodiment, the operation unit 9 or the input interface 27 may have an adjustment knob, slider, or the like for changing, as desired, the designation of the region or the display mode having been automatically selected. If the display 251 is configured as a touch panel display, the display control function 216 may display, together with the X-ray projection image, icons such as those of an adjustment knob and a slider on the display 251 for changing, as desired, the designation of the region or the display mode having been automatically selected.

Thus, with the X-ray diagnostic apparatus 100 according to this embodiment, the visibility of the region of interest in the X-ray projection image can be automatically improved in accordance with the examination protocol. The technology according to the embodiment may be combined with those according to any of the embodiments described above.

Sixth Embodiment

An X-ray diagnostic apparatus 100 according to a sixth embodiment will now be explained. Differences with respect to the first embodiment will be mainly explained below.

A medical image processing system 1 according to this embodiment further includes a respirometer or an electrocardiograph. The respirometer or the electrocardiograph can communicate with other devices over the network 900, such as a hospital LAN.

In the X-ray diagnostic apparatus 100 according to this embodiment, the acquiring function 213 acquires an output (respiratory waveform, electrocardiogram) from the respirometer or the electrocardiograph. The acquiring function 213 acquires 4D-CT data including a time axis, as CT volume data. The acquiring function 213 acquires, at Step S201, the output of the respirometer or the electrocardiograph along with a raw live X-ray attenuation image (projection data) for the selected subject P. At Step S202, the acquiring function 213 acquires the CT volume data that is synchronized with the respiratory or cardiac phase of the acquired X-ray attenuation image.

Thus, with the X-ray diagnostic apparatus 100 according to this embodiment, by ensuring respiratory synchronization or cardiac synchronization, it is possible to improve the visibility of the region of interest even with an image-capturing region where the selected region keeps moving. The technology according to the embodiment may be combined with those according to any of the embodiments described above.

Seventh Embodiment

An X-ray diagnostic apparatus 100 according to a seventh embodiment will now be explained. Differences with respect to the first embodiment will be mainly explained below.

In the X-ray diagnostic apparatus 100 according to this embodiment, the image processing function 215 can also replace the selected region with another substance, before calculating the value for compensating for the amount of X-ray attenuation in the case of including the selected region. For example, when the amount of X-ray attenuation caused by the vertebrae 705 that are the selected region is compensated, as illustrated in FIG. 5, the amount of X-ray attenuation becomes smaller on the X-ray paths by the amount compensated for the attenuation caused by the vertebrae 705, in the X-ray attenuation image after the compensation. As a result, the positions corresponding to the vertebrae 705 may stand out from the surroundings in the X-ray projection image after the compensation. To address this issue, for example, when a portion corresponding to a bone or to the air inside the lung field is selected as the selected region, the image processing function 215 calculates the compensation value by replacing the selected region with the water.

In this manner, by replacing the attenuation coefficient of the selected region with the attenuation coefficient of another substance and calculating the compensation value, the selected region can be displayed in a manner standing out less, when the display mode of the selected region is changed. The technology according to the embodiment may be combined with those according to any of the embodiments described above.

Eighth Embodiment

An X-ray diagnostic apparatus 100 according to an eighth embodiment will now be explained. Differences with respect to the first embodiment will be mainly explained below.

Figure 11:
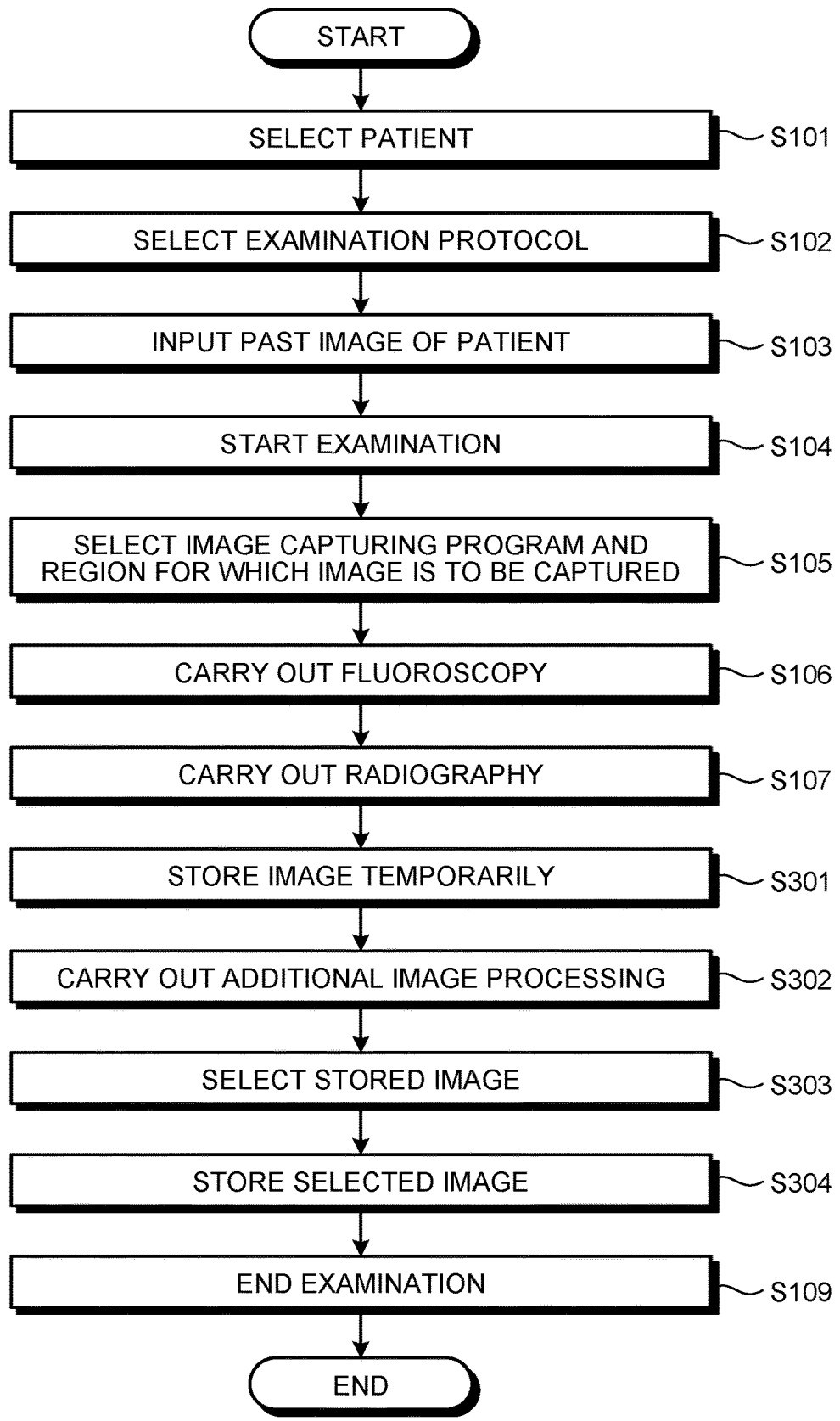
FIG. 11 is a flowchart illustrating an example of a workflow according to an eighth embodiment.

FIG. 11 is a flowchart illustrating an example of a workflow according to the eighth embodiment. Only the differences with respect to the workflow illustrated in FIG. 7 will be explained below.

After performing the fluoroscopy and the radiography (Steps S106 and S107), the operator selects the X-ray projection image to be stored, and temporarily stores the X-ray projection image (Step S301). The operator then performs additional image processing based on the X-ray attenuation image corresponding to the temporarily stored X-ray projection image, in the same manner as in the image processing illustrated in FIG. 8 (Step S302). The operator then selects an X-ray projection image to be stored, from the temporarily stored X-ray projection image and the X-ray projection image applied with additional image processing (Step S303), and stores the X-ray projection image (Step S304). The operator then ends the examination of the subject P using the X-ray diagnostic apparatus 100 (Step S109).

The flowchart illustrated in FIG. 11 is an example of the workflow according to the embodiment, and it is possible to change the order of these steps, or to add another step or to delete a step to or from the workflow. For example, in an actual examination, Steps S105 to S304 may be repeated in any order, depending on the situation, in the same manner as in the workflow illustrated in FIG. 7 or the sequence of the image processing illustrated in FIG. 8.

Thus, the image processing according to the embodiment may be applied not only to a live image being captured during the fluoroscopy or the radiography, but also to an image having been stored. The image processing according to the embodiment may be performed when the image processing illustrated in FIG. 8 is not performed in the fluoroscopy or the radiography. The technology according to the embodiment may be combined with those according to any of the embodiments described above.

Ninth Embodiment

An X-ray diagnostic apparatus 100 according to a ninth embodiment will now be explained. Differences with respect to the eighth embodiment will be mainly explained below.

Figure 12:
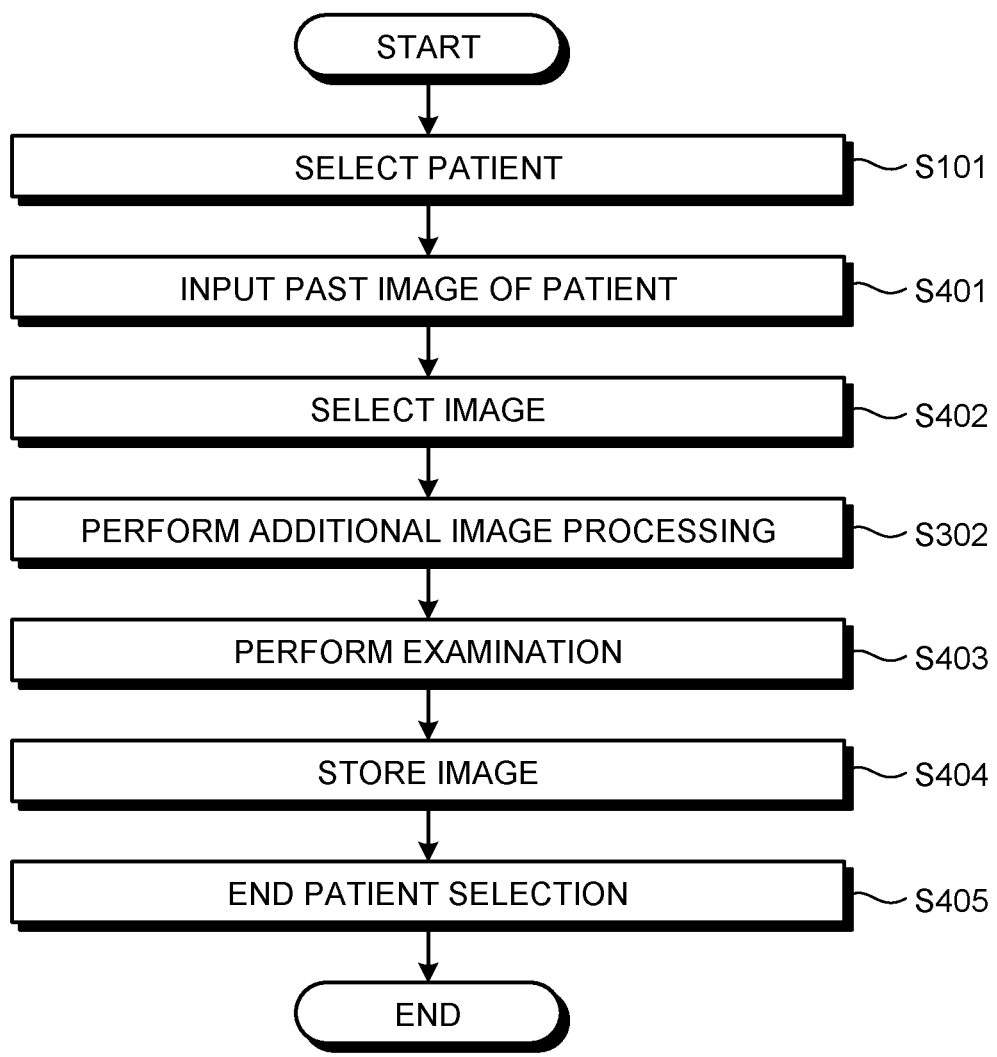
FIG. 12 is a flowchart illustrating an example of a workflow according to a ninth embodiment.

FIG. 12 is a flowchart illustrating an example of a workflow according to the ninth embodiment. Differences with respect to the workflows illustrated in FIGS. 7 and 11 will be explained below.

After the patient is selected (Step S101), the operator inputs CT volume data previously acquired by the X-ray CT apparatus 200 into the X-ray diagnostic apparatus 100 (Step S401). The operator also selects an X-ray attenuation image or an X-ray projection image previously acquired for the selected subject P, by the X-ray diagnostic apparatus 100 (Step S402). The X-ray attenuation image or the X-ray projection image may be acquired from the outside of the X-ray diagnostic apparatus 100, such as the PACS 500. The operator then performs additional image processing based on the X-ray attenuation image corresponding to the temporarily stored X-ray projection image, in the same manner as the image processing illustrated in FIG. 8 (Step S302). The operator then makes a diagnosis for the subject P based on the compensated X-ray projection image acquired as a result of the additional image processing (Step S403). The operator then stores the acquired X-ray projection image (Step S404), and ends the patient selection (S405).

The flowchart illustrated in FIG. 12 is an example of the workflow according to the embodiment, and it is possible to change the order of these steps, or to add another step or to delete a step to or from the workflow. For example, in an actual examination, Steps S402 to S404 may be repeated in any order, depending on the situation, in the same manner as in the sequence of the image processing illustrated in FIG. 8. Steps S402 to S404 may be performed in an order appropriate for each of the selected images, while the selected image is being changed.

Thus, the image processing according to the embodiment may be applied not only to a live image being captured during the fluoroscopy or the radiography, but also to an image having been stored. The image processing according to the embodiment may be performed when the image processing illustrated in FIG. 8 is not performed in the fluoroscopy or radiography. The technology according to the embodiment may be combined with those according to any of the embodiments described above.

Tenth Embodiment

An X-ray diagnostic apparatus 100, as a medical image processing apparatus, according to a tenth embodiment will now be explained. Differences with respect to the first embodiment will be mainly explained below.

Explained in the first embodiment is an example of the image processing in which the amount of X-ray attenuation that is the amount of X-ray attenuation in the case of including the selected region is compensated, using the compensation value for the X-ray intensity, as indicated in Equation (1). At this time, the amount of X-ray attenuation has a correlation with shading (darkness) in the imaged X-ray attenuation image, i.e., with a darkness attenuation image. Therefore, explained in this embodiment is image processing that uses a darkness compensation value for compensating for the amount of darkness attenuation, as the amount of X-ray attenuation in the case of including the selected region.

The image processing function 215 according to the embodiment acquires a raw live darkness attenuation image from a raw live X-ray attenuation image (projection data) by applying a log transformation (logarithmic transformation) to the X-ray intensity.

The image processing function 215 according to this embodiment calculates the amount of darkness attenuation corresponding to the amount of X-ray attenuation in the case of including the selected region, as a compensation value (D2), for each X-ray path B based on the CT volume data.

The compensation value D2 may be calculated, for example, by the following Equation (2).

$$D2 = \left\{\log_e\left(X0 \times e^{-\Sigma \mu n'(kV) \cdot dn'}\right) - \log_e\left(X0 \times e^{-\Sigma \mu n(kV) \cdot dn}\right)\right\} \times D1/100 \quad (2)$$

$$= \left\{\sum \mu n(kV) \cdot dn - \sum \mu n'(kV) \cdot dn'\right\} \times D1/100$$

In this equation, D1 is the ratio (%) at which the darkness (the amount of darkness attenuation) is corrected.

In other words, the image processing function 215 according to this embodiment performs calculation to obtain a calculation value of the amount by which the darkness is to be corrected, the darkness being that after the logarithmic transformation of the X-ray intensity, that is, the darkness, as the compensation value (D2). The compensation value (D2) can be calculated using the X-ray attenuation coefficient, as indicated in Equation (2).

The darkness correction ratio (D1%) is the percentage by which the darkness attenuation is corrected for the selected region, and is a value determined by a designation of the display mode for the selected region described above. For example, to set not to display the selected region, the darkness correction ratio is set to 100%. To change the darkness of the selected region, the darkness correction ratio is set to less than 100%. At this time, the darkness correction ratio is set to a positive value to make the shade of the selected region lighter, and to a negative value to make the shade of the selected region darker.

The image processing function 215 adds the calculated compensation value (D2) to the raw live darkness attenuation image to perform calculation for a darkness attenuation image resultant of compensating for the amount of darkness attenuation related to the selected region. The image processing function 215 outputs the calculated darkness attenuation image after the compensation to the storage 23.

Figure 13:
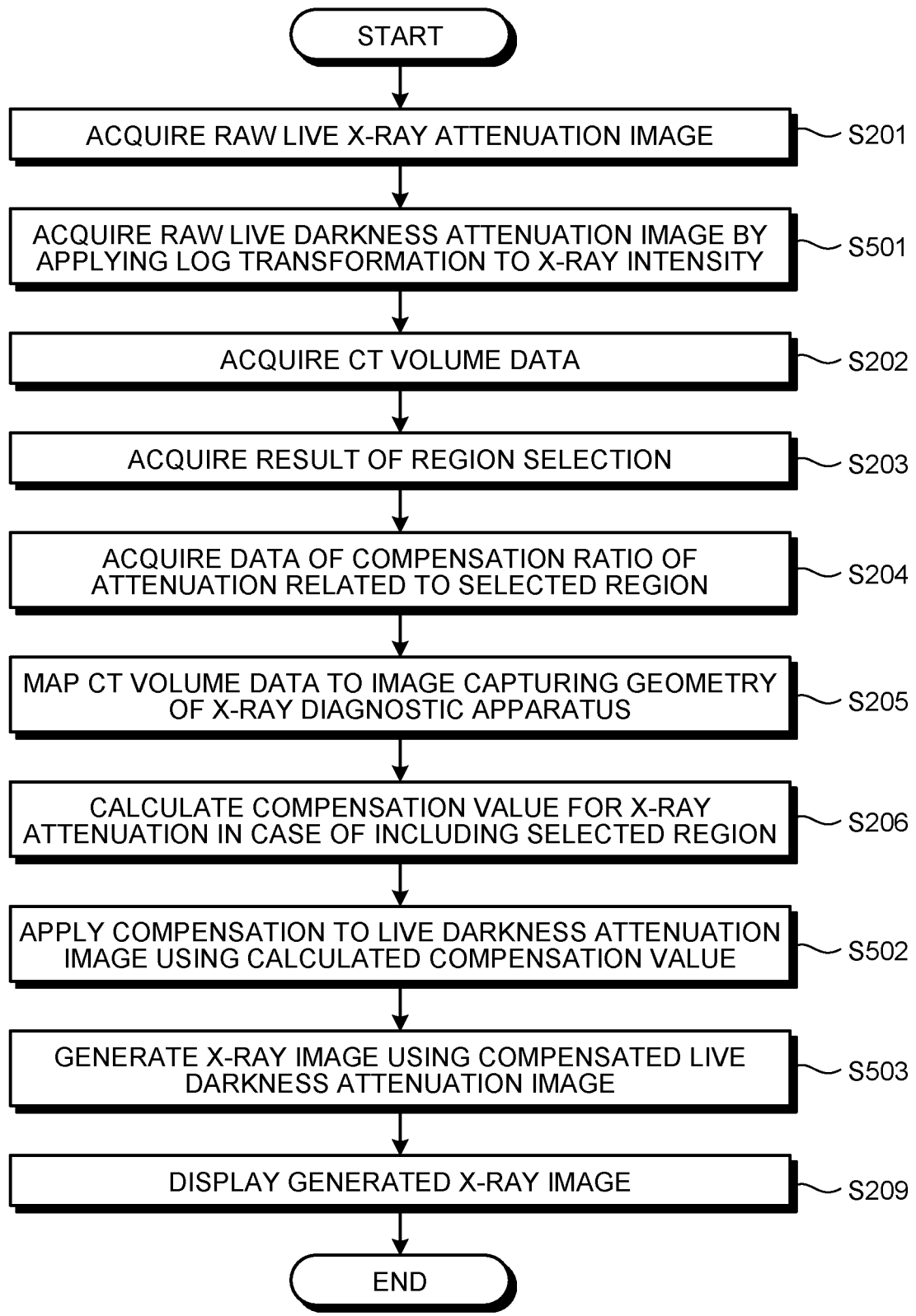
FIG. 13 is a flowchart illustrating an example of image processing according to a tenth embodiment.

FIG. 13 is a flowchart illustrating an example of image processing according to the tenth embodiment. The image processing illustrated in FIG. 13 is performed at Step S106 or Step S107 in the workflow illustrated in FIG. 7, for example. Differences with respect to the sequence of the image processing illustrated in FIG. 8 will be mainly explained below.

After the raw live X-ray attenuation image (projection data) for the selected subject P is acquired (Step S201), the image generating function 212 generates an X-ray image to be displayed, based on the projection data, and also acquires a raw live darkness attenuation image (S501). Specifically, the image generating function 212 generates a raw live darkness attenuation image from the projection data by applying log transformation to the X-ray intensity.

After acquiring the CT image data (Step S202) and the result of region selection (Step S203), the acquiring function 213 acquires a designation of the display mode for the selected region received by the selecting function 214, that is, data of a compensation ratio (darkness correction ratio) of attenuation related to the selected region (Step S204).

The image processing function 215 then maps the CT volume data to the image capturing geometry of the X-ray diagnostic apparatus 100 (Step S205), and calculates the compensation value (D2) for the darkness attenuation in the case of including the selected region (Step S206). Using the calculated compensation value (D2), the image processing function 215 applies a compensation to the live darkness attenuation image acquired at Step S501 (Step S502).

The image generating function 212 generates an X-ray projection image using the live darkness attenuation image for which the amount of darkness attenuation related to the selected region has been compensated by the image processing function 215 (Step S503). After the display control function 216 displays the generated X-ray projection image on the display 251 (Step S209), the sequence illustrated in FIG. 13 is ended.

The flowchart illustrated in FIG. 13 is an example of the sequence of the image processing according to the embodiment, and it is possible to change the order of these steps, or to add another step or to delete a step to or from this sequence. For example, in the actual processing, Steps S203 to S209 including Steps S502 to S503 may be repeated in any order, depending on the situation. As an example, while the selected region and the display mode are changed, Steps S203 to S209 may be performed in any order based on the selected region or the display mode.

Thus, with the image processing according to this embodiment, it is possible to obtain an X-ray projection image in which the X-ray attenuation caused by the selected region is compensated, through a calculation related to the attenuation coefficient. Therefore, by simplifying the calculation equation, it is possible to reduce the amount of calculation required for the X-ray image compensation calculation, so that the real-time performance of the compensation calculation of X-ray images can be improved.

Other Application Examples

Application examples of the image processing according to the embodiments described above will now be explained.

Figure 14:
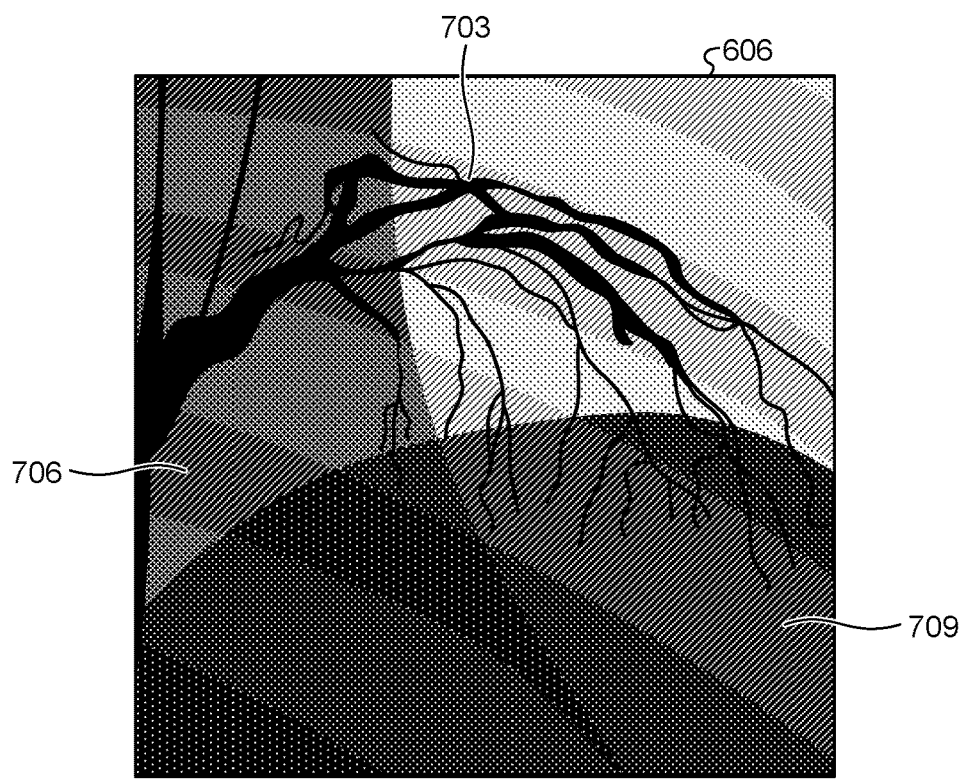
FIG. 14 is a schematic illustrating an application example of the image processing according to the embodiments.

FIG. 14 is a schematic illustrating an application example of the image processing according to the embodiments. FIG. 14 is a schematic illustrating an example of an X-ray projection image 606 before compensation by the image processing according to the embodiments. The visibility of cardiac blood vessels 703 and devices sometimes deteriorate when the cardiac blood vessels 703 and the devices overlap with a diaphragm 709 or ribs 706, for example. For example, as illustrated in FIG. 14, the peripheral blood vessels 703 in the left coronary artery sometimes overlap with the diaphragm 709. In such a case, the display of the diaphragm 709 and the ribs 706 can be modified by applying the image processing according to the embodiments described above, so as to improve the visibility of the peripheral left coronary artery blood vessel 703.

Figure 15:
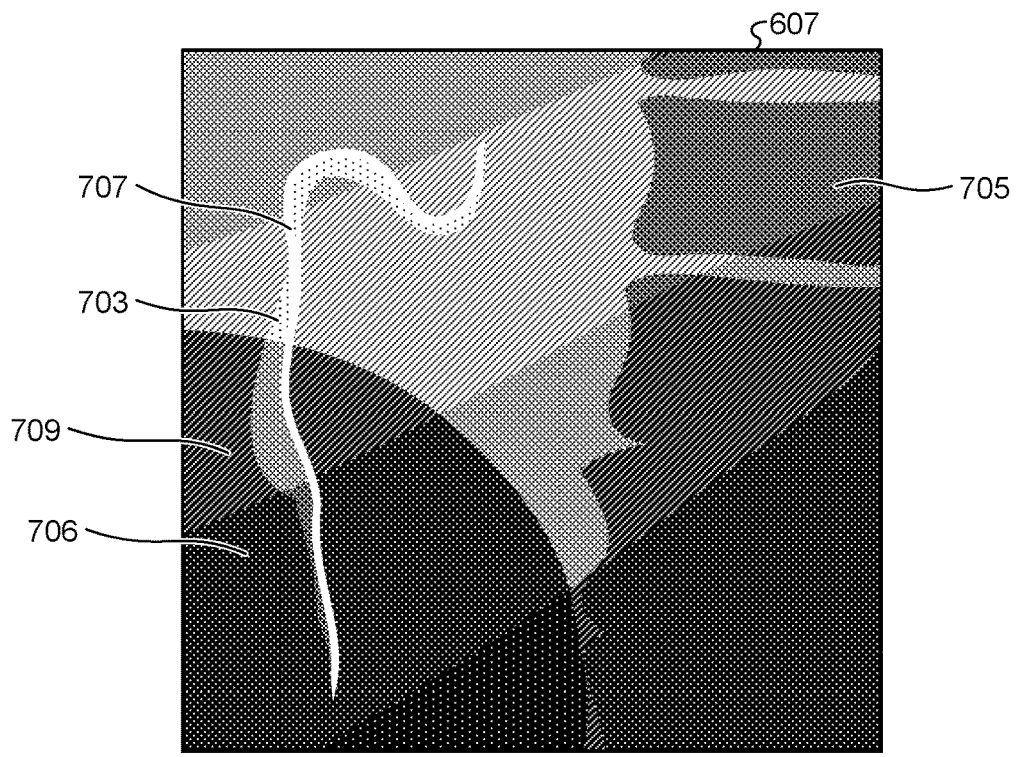
FIG. 15 is a schematic illustrating an application example of the image processing according to the embodiments.

FIG. 15 is a schematic illustrating an application example of the image processing according to the embodiments. FIG. 15 is a schematic illustrating an example of an X-ray projection image 607 before compensation by the image processing according to the embodiments. For example, as illustrated in FIG. 15, a device 707, such as a catheter inserted in the right coronary blood vessel 703 or the cardiac blood vessel 703, sometimes overlaps with the diaphragm 709. In such a case, by applying the image processing according to the embodiments described above, the display mode of the diaphragm 709 may be changed so as to improve the visibility of the right coronary artery blood vessel 703 or the device 707. At this time, the display mode of the ribs 706 may further be modified. In addition, because the user can select the region for which the display mode is changed by receiving the X-ray projection image 607 before compensation, the vertebrae 705 not overlapping with the region of interest may be left displayed as markers, as illustrated in FIG. 15.

Figure 16:
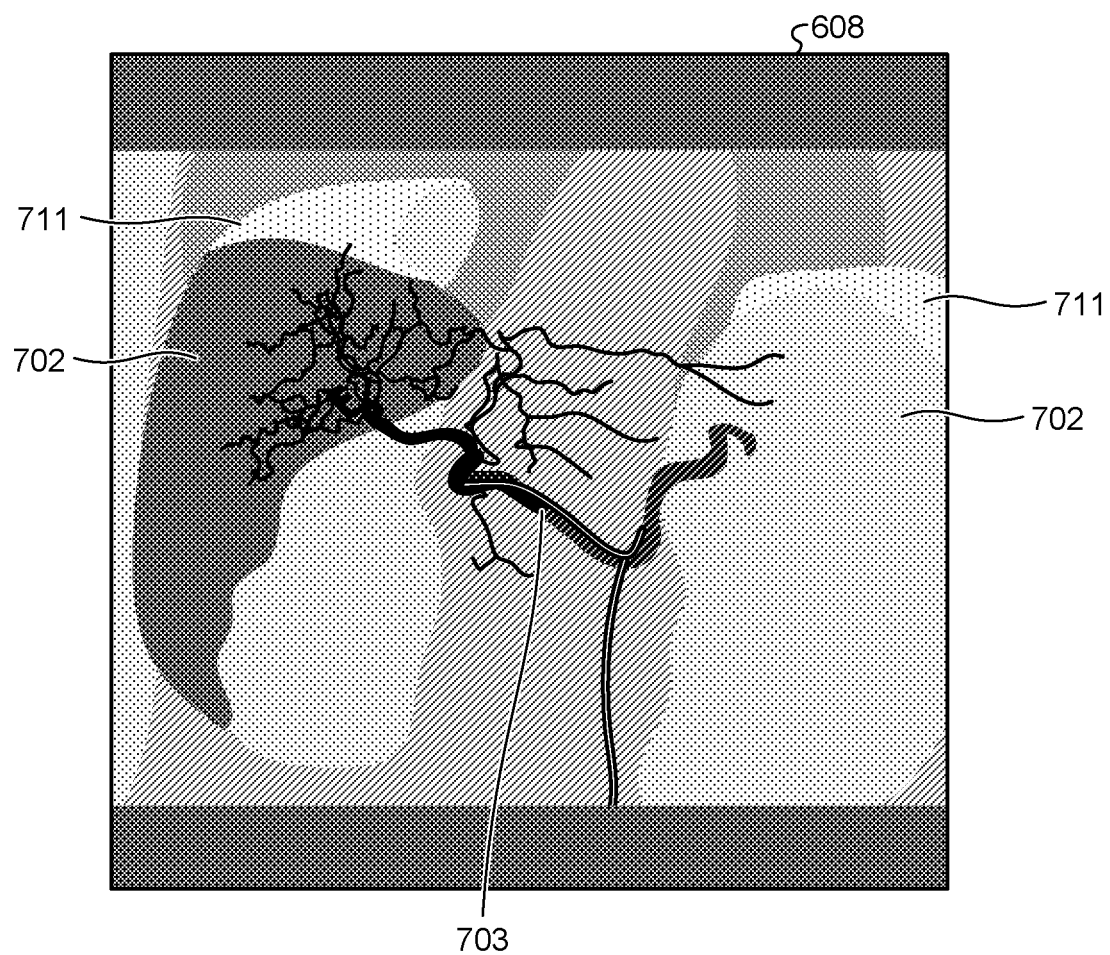
FIG. 16 is a schematic illustrating an application example of the image processing according to the embodiments.

FIG. 16 is a schematic illustrating an application example of the image processing according to the embodiments. FIG. 16 is a schematic illustrating an example of an X-ray projection image 608 before compensation by the image processing according to the embodiments. The X-ray projection image 608 illustrates an image acquired by abdominal DSA. In the DSA imaging, any movement in the X-ray diagnostic apparatus 100 or the subject P may cause misregistration artifacts, resulting in inversion of black and white colors or halation areas 711. The visibility of the blood vessels 703 may deteriorate in the area where the halation areas 711 overlap with the blood vessels 703. In such a case, by applying the image processing according to the embodiments described above, the display mode for an organ 702 may be changed to no-display, for example, so as to alleviate the misregistration artifacts. If the organ 702 and other organs of the subject P move due to respiration, the image processing according to the sixth embodiment may be applied so as to change the display mode for the organ 702 to no-display, for example, so as to reduce the misregistration artifacts. Therefore, in the abdominal DSA, by not displaying the organ 702, the inversion of the black and white colors can be suppressed even if the subject P does not stop breathing, so that the visibility of the region of interest can be improved even in fluoroscopy or the radiography for a subject P who is not able to stop breathing.

The target for which the display mode is changed as a selected region is not limited to the region mentioned above, but may be any region of the subject P, such as the heart or a shoulder. For example, by changing the display mode for the heart, it is possible to improve the visibility of coronary arteries. For example, by changing the display mode for the shoulders during lateral cervical radiography, it is possible to improve the visibility of the lower part of the cervical spine. The target for which the display mode is to be changed as a selected region is not limited to the region of the subject P, but may be an object inserted in the subject P, such as an implanted device, e.g., a pacemaker, a catheter excluding the tip portion, or a surgical stapler.

In the X-ray diagnostic apparatus 100 according to each of the embodiments described above, some of the functions of the processing circuitry 21 may be implemented by an apparatus external to the X-ray diagnostic apparatus 100. As an example, a medical image processing apparatus having processing circuitry that implements the image generating function 212, the acquiring function 213, the selecting function 214, and the image processing function 215, as well as a part of the storage 23, can perform the processing according to each of the embodiments described above.

According to at least one of the embodiments described above, the visibility of the region of interest in the X-ray projection image can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For the embodiments described above, the following Notes are disclosed, as aspects and selective features of the inventions.

Note. 1

An X-ray diagnostic apparatus comprising:
an X-ray tube configured to generate X-rays;
an X-ray detector configured to detect X-rays emitted from the X-ray tube and transmitted through a subject; and
processing circuitry configured to:
receive a designating operation related to a display mode of a target that is at least one of a region of the subject and an object inserted in the subject; and
change the display mode of the target in an X-ray projection image that is based on a detection result of the X-ray detector, the display mode being changed based on three-dimensional medical image data related to the subject, in accordance with the designating operation.

Note. 2

An X-ray diagnostic apparatus comprising:
an X-ray tube configured to generate X-rays;
an X-ray detector configured to detect X-rays emitted from the X-ray tube and transmitted through a subject; and
processing circuitry configured to:
receive a selecting operation for selecting a target for which a display mode is to be changed, from a region of the subject or an object inserted in the subject; and
change the display mode of the target in an X-ray projection image that is based on a detection result of the X-ray detector, the display mode being changed based on three-dimensional medical image data related to the subject.

Note. 3

The change in the display mode may be a change in darkness at which the target is displayed, or a change for not displaying the target.

Note. 4

The processing circuitry may be configured to change the display mode of the target by applying a compensation to the detection result of the X-ray detector using an amount of X-ray attenuation that is calculated based on the three-dimensional medical image data, the X-ray attenuation caused by the target in an image capturing geometry of the X-ray diagnostic apparatus.

Note. 5

The processing circuitry may be configured to change the display mode of the target by applying a compensation to the detection result of the X-ray detector using an X-ray attenuation coefficient that is calculated based on the three-dimensional medical image data, the X-ray attenuation coefficient being that related to the target in an image capturing geometry of the X-ray diagnostic apparatus.

Note. 6

The processing circuitry may be configured to apply a compensation to the detection result of the X-ray detector by replacing the X-ray attenuation coefficient related to the target with that related to another substance.

Note. 7

The processing circuitry may be configured to generate a mask image depicting an angiogram image by changing the display mode of targets other than blood vessels in an X-ray projection image that is based on a detection result of the X-ray detector detected during angiography to no-display.

Note. 8

The processing circuitry may be configured to change the display mode of the target in the X-ray projection image, based on the detection result of the X-ray detector and the three-dimensional medical image data with a matching respiratory or cardiac phase.

Note. 9

The processing circuitry may be configured to receive an input of an examination protocol as the designating operation.
The processing circuitry may be configured to change the display mode of the target to a display mode corresponding to the examination protocol.

Note. 10

The processing circuitry may be configured to receive an input of an examination protocol as the selecting operation.

The processing circuitry may be configured to change the display mode of the target corresponding to the examination protocol.

Note. 11

A medical image processing apparatus comprising processing circuitry configured to:
receive a designating operation related to a display mode of a target that is at least one of a region of the subject and an object inserted in the subject in an X-ray projection image that is based on X-rays transmitted through the subject; and
change the display mode of the target in the X-ray projection image based on three-dimensional medical image data related to the subject, in accordance with the designating operation.

Note. 12

The processing circuitry may be configured to receive a selecting operation for selecting a target for which the display mode is to be changed, from a region of the subject and an object inserted in the subject.
The processing circuitry may be configured to change the display mode of the target in the X-ray projection image based on the three-dimensional medical image data related to the subject.

Note. 13

A medical image processing apparatus comprising processing circuitry configured to:
receive a selecting operation for selecting a target for which the display mode is to be changed, from a region of the subject and an object inserted in the subject in an X-ray projection image that is based on X-rays transmitted through the subject; and
change the display mode of the target in the X-ray projection image based on three-dimensional medical image data related to the subject.

Note. 14

A medical image processing program that causes a computer to:
receive a designating operation related to a display mode of a target that is at least one of a region of the subject and an object inserted in the subject in an X-ray projection image that is based on X-rays transmitted through the subject; and
change the display mode of the target in the X-ray projection image based on three-dimensional medical image data related to the subject, in accordance with the designating operation.

Note. 15

The medical image processing program comprises:
receiving a selecting operation for selecting a target for which the display mode is to be changed, from a region of the subject and an object inserted in the subject; and
changing the display mode of the target in the X-ray projection image, based on three-dimensional medical image data related to the subject.

Note. 16

A medical image processing program that causes a computer to execute:

receiving a selecting operation for selecting a target for which a display mode is to be changed, from a region of the subject or an object inserted in the subject in an X-ray projection image that is based on X-rays transmitted through the subject; and
changing the display mode of the target in the X-ray projection image, based on three-dimensional medical image data related to the subject.

Note. 17

The change in the display mode may be a change in darkness at which the target is displayed, or a change for not displaying the target.

Note. 18

A computer program product configured to store therein the medical image processing program executed by the computer.

What is claimed is:
1. An X-ray diagnostic apparatus comprising:
an X-ray tube configured to generate X-rays;
an X-ray detector configured to detect X-rays emitted from the X-ray tube and transmitted through a subject; and
processing circuitry configured to:
receive a designating operation related to a display mode of a target that is at least one of a region of the subject and an object inserted in the subject; and
change the display mode of the target in an X-ray projection image that is based on a detection result of the X-ray detector, the display mode being changed based on three-dimensional medical image data related to the subject, in accordance with the designating operation,
wherein the processing circuitry is configured to change the display mode of the target by applying a compensation to the detection result of the X-ray detector using an amount of X-ray attenuation that is calculated based on the three-dimensional medical image data or an X-ray attenuation coefficient that is calculated based on the three-dimensional medical image data, the X-ray attenuation caused by the target in an image capturing geometry of the X-ray diagnostic apparatus, the X-ray attenuation coefficient being that related to the target in an image capturing geometry of the X-ray diagnostic apparatus.
2. The X-ray diagnostic apparatus according to claim 1, wherein the change in the display mode is a change in darkness at which the target is displayed, or a change for not displaying the target.
3. The X-ray diagnostic apparatus according to claim 1, wherein the processing circuitry is configured to apply a compensation to the detection result of the X-ray detector by replacing an X-ray attenuation coefficient related to the target with that related to another substance.
4. The X-ray diagnostic apparatus according to claim 1, wherein the processing circuitry is configured to perform a compensation to the detection result of the X-ray detector by replacing an X-ray attenuation coefficient related to the target with that related to another substance.
5. The X-ray diagnostic apparatus according to claim 1, wherein the processing circuitry is configured to generate a mask image depicting an angiogram image by changing the display mode of targets other than blood vessels in an X-ray projection image that is based on a detection result of the X-ray detector detected during angiography to no-display.

6. The X-ray diagnostic apparatus according to claim 1, wherein the processing circuitry is configured to change the display mode of the target in the X-ray projection image, based on the detection result of the X-ray detector and the three-dimensional medical image data with a matching respiratory or cardiac phase.

7. The X-ray diagnostic apparatus according to claim 1, wherein the processing circuitry is configured to:
- receive an input of an examination protocol as the designating operation, and
- change the display mode of the target to a display mode corresponding to the examination protocol.

8. An X-ray diagnostic apparatus comprising:
an X-ray tube configured to generate X-rays;
an X-ray detector configured to detect X-rays emitted from the X-ray tube and transmitted through a subject; and
processing circuitry configured to:
- receive a selecting operation for selecting a target for which a display mode is to be changed, from a region of the subject or an object inserted in the subject; and
- change the display mode of the target in an X-ray projection image that is based on a detection result of the X-ray detector, the display mode being changed based on three-dimensional medical image data related to the subject,
wherein the processing circuitry is configured to change the display mode of the target by applying a compensation to the detection result of the X-ray detector using an amount of X-ray attenuation that is calculated based on the three-dimensional medical image data or an X-ray attenuation coefficient that is calculated based on the three-dimensional medical image data, the X-ray attenuation caused by the target in an image capturing geometry of the X-ray diagnostic apparatus, the X-ray attenuation coefficient being that related to the target in an image capturing geometry of the X-ray diagnostic apparatus.

9. The X-ray diagnostic apparatus according to claim 8, wherein the change in the display mode is a change in darkness at which the target is displayed, or a change for not displaying the target.

10. The X-ray diagnostic apparatus according to claim 8, wherein the processing circuitry is configured to generate a mask image depicting an angiogram image by changing the display mode of targets other than blood vessels in an X-ray projection image that is based on a detection result of the X-ray detector detected during angiography to no-display.

11. The X-ray diagnostic apparatus according to claim 8, wherein the processing circuitry is configured to change the display mode of the target in the X-ray projection image, based on the detection result of the X-ray detector and the three-dimensional medical image data with a matching respiratory or cardiac phase.

12. The X-ray diagnostic apparatus according to claim 8, wherein the processing circuitry is configured to:
- receive an input of an examination protocol as the selecting operation, and
- change the display mode of the target corresponding to the examination protocol.

13. A non-transitory computer program product storing therein a computer program executed by a computer, the computer program causing the computer to execute:
- receiving a designating operation related to a display mode of a target that is at least one of a region of a subject and an object inserted in the subject in an X-ray projection image that is based on X-rays transmitted through the subject;
- changing the display mode of the target in the X-ray projection image based on three-dimensional medical image data related to the subject, in accordance with the designating operation;
wherein in the change the display mode of the target, the display mode of the target is changed by applying a compensation to a detection result of an X-ray detector using an amount of X-ray attenuation that is calculated based on the three-dimensional medical image data or an X-ray attenuation coefficient that is calculated based on the three-dimensional medical image data, the X-ray attenuation caused by the target in an image capturing geometry of an X-ray diagnostic apparatus, the X-ray attenuation coefficient being that related to the target in the image capturing geometry of the X-ray diagnostic apparatus.

14. The non-transitory computer program product according to claim 13, wherein the computer program causes the computer to execute:
- receiving a selecting operation for selecting a target for which a display mode is to be changed, from a region of the subject or an object inserted in the subject, and
- changing the display mode of the target in the X-ray projection image, based on three-dimensional medical image data related to the subject.

15. The non-transitory computer program product according to claim 14, wherein the change in the display mode is a change in darkness at which the target is displayed, or a change for not displaying the target.

16. The non-transitory computer program product according to claim 13, wherein the change in the display mode is a change in darkness at which the target is displayed, or a change for not displaying the target.

* * * * *